United States Patent
Huang et al.

(10) Patent No.: US 11,632,752 B2
(45) Date of Patent: *Apr. 18, 2023

(54) METHODS FOR MULTI-LINK SETUP BETWEEN A MULTI-LINK ACCESS POINT (AP) LOGICAL ENTITY AND A MULTI-LINK NON-AP LOGICAL ENTITY

(71) Applicant: Intel Corporation, Santa Clara, CA (US)

(72) Inventors: Po-Kai Huang, San Jose, CA (US); Laurent Cariou, Portland, OR (US); Daniel F. Bravo, Hillsboro, OR (US); Arik Klein, Givaat Shmuel (IL); Robert J. Stacey, Portland, OR (US); Daniel Leiderman, Ra'anana (IL); Ofer Schreiber, Kryat Ono (IL); Danny Ben-Ari, Hasharon Hatichon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,042

(22) Filed: Sep. 3, 2021

(65) Prior Publication Data

US 2021/0400662 A1    Dec. 23, 2021

Related U.S. Application Data

(63) Continuation of application No. 16/508,972, filed on Jul. 11, 2019, now Pat. No. 11,202,286.
(Continued)

(51) Int. Cl.
*H04W 72/04*    (2009.01)
*H04L 41/0893*   (2022.01)
(Continued)

(52) U.S. Cl.
CPC ..... *H04W 72/0426* (2013.01); *H04L 41/0893* (2013.01); *H04W 8/26* (2013.01);
(Continued)

(58) Field of Classification Search
CPC ... H04W 72/0426; H04W 8/26; H04W 48/08; H04W 72/048; H04W 72/085; H04L 41/0893
See application file for complete search history.

(56) References Cited

U.S. PATENT DOCUMENTS

2005/0135284 A1    6/2005   Nanda et al.
2009/0073945 A1    3/2009   Seok
(Continued)

FOREIGN PATENT DOCUMENTS

CN        110995306 A  *  4/2020   ............... H03K 5/13

OTHER PUBLICATIONS

U.S. Appl. No. 16/508,972, filed Jul. 11, 2019, Methods for Multi-Link Setup Between a Multi-Link Access Point (AP) Logical Entity and a Multi-Link Non-AP Logical Entity.
(Continued)

*Primary Examiner* — Jael M Ulysse
(74) *Attorney, Agent, or Firm* — Schwegman Lundberg & Woessner, P.A.

(57) ABSTRACT

Embodiments of an access point (AP), station (STA) and method of communication are generally described herein. The AP may be included in a plurality of APs affiliated with a multi-link AP logical entity. As part of a multi-link AP logical entity, the plurality of APs may share a common medium access control (MAC) data service interface to an upper layer. The AP may exchange signaling with an STA as part of a multi-link setup process between the multi-link TP logical entity and a multi-link non-AP logical entity. The STA may be included in a plurality of STAs affiliated with
(Continued)

the multi-link non-AP logical entity. The multi-link setup process may establish a link between each AP of the plurality of APs and a corresponding STA of the plurality of STAs.

20 Claims, 16 Drawing Sheets

Related U.S. Application Data

(60) Provisional application No. 62/827,336, filed on Apr. 1, 2019, provisional application No. 62/765,025, filed on Aug. 17, 2018, provisional application No. 62/696,494, filed on Jul. 11, 2018, provisional application No. 62/696,498, filed on Jul. 11, 2018.

(51) Int. Cl.
*H04W 8/26* (2009.01)
*H04W 72/08* (2009.01)
*H04W 48/08* (2009.01)
*H04W 84/12* (2009.01)

(52) U.S. Cl.
CPC ......... *H04W 48/08* (2013.01); *H04W 72/048* (2013.01); *H04W 72/085* (2013.01); *H04W 84/12* (2013.01)

(56) References Cited

U.S. PATENT DOCUMENTS

| | | | |
|---|---|---|---|
| 2009/0323608 A1* | 12/2009 | Adachi | H04W 48/08 370/329 |
| 2010/0020746 A1 | 1/2010 | Zaks | |
| 2010/0177656 A1 | 7/2010 | Kim et al. | |
| 2011/0103264 A1 | 5/2011 | Wentink | |
| 2011/0116487 A1 | 5/2011 | Grandhi | |
| 2013/0188628 A1 | 7/2013 | Lee et al. | |
| 2013/0201866 A1 | 8/2013 | Wentink et al. | |
| 2013/0265907 A1 | 10/2013 | Kim et al. | |
| 2014/0064261 A1 | 3/2014 | Wang et al. | |
| 2014/0133530 A1 | 5/2014 | Maguire | |
| 2014/0206346 A1 | 7/2014 | Kiukkonen et al. | |
| 2014/0219263 A1 | 8/2014 | Seok | |
| 2014/0314054 A1 | 10/2014 | Seok et al. | |
| 2014/0348148 A1 | 11/2014 | You et al. | |
| 2015/0172996 A1 | 6/2015 | Park et al. | |
| 2015/0195860 A1* | 7/2015 | Joshi | H04W 76/14 370/338 |
| 2015/0319700 A1 | 11/2015 | Oteri et al. | |
| 2016/0021609 A1 | 1/2016 | Park et al. | |
| 2016/0157279 A1 | 6/2016 | Wang et al. | |
| 2016/0249397 A1 | 8/2016 | Seok | |
| 2017/0064695 A1 | 3/2017 | Zhou et al. | |
| 2017/0118602 A1* | 4/2017 | Seok | H04B 7/2612 |
| 2017/0195035 A1 | 7/2017 | Calcev et al. | |
| 2017/0318614 A1 | 11/2017 | Wang et al. | |
| 2018/0124866 A1 | 5/2018 | Asterjadhi et al. | |
| 2018/0242373 A1* | 8/2018 | Wang | H04W 74/004 |
| 2018/0279171 A1 | 9/2018 | Matsuo et al. | |
| 2018/0310338 A1 | 10/2018 | Li et al. | |
| 2018/0376467 A1* | 12/2018 | Patil | H04W 72/0426 |
| 2019/0075549 A1* | 3/2019 | Yucek | H04W 72/02 |
| 2019/0320385 A1* | 10/2019 | Bhartia | H04W 28/0942 |
| 2019/0335454 A1 | 10/2019 | Huang et al. | |

OTHER PUBLICATIONS

"U.S. Appl. No. 16/508,972, Non Final Office Action dated Apr. 26, 2021", 29 pgs.
"U.S. Appl. No. 16/508,972, Notice of Allowance dated Aug. 11, 2021", 15 pgs.
"U.S. Appl. No. 16/508,972, Response filed Jul. 21, 2021 to Non Final Office Action dated Apr. 26, 2021", 12 pgs.

* cited by examiner

1100

1400

1500

1600

1700

1800

1900

2000

METHODS FOR MULTI-LINK SETUP BETWEEN A MULTI-LINK ACCESS POINT (AP) LOGICAL ENTITY AND A MULTI-LINK NON-AP LOGICAL ENTITY

PRIORITY CLAIM

This application is a continuation of U.S. patent application Ser. No. 16/508,972, filed Jul. 11, 2019, which claims priority under 35 U.S.C. 119(e) to U.S. Provisional Patent Application Ser. No. 62/696,494, filed Jul. 11, 2018, and to U.S. Provisional Patent Application Ser. No. 62/696,498, filed Jul. 11, 2018, and to U.S. Provisional Patent Application Ser. No. 62/765,025, filed Aug. 17, 2018, and to U.S. Provisional Patent Application Ser. No. 62/827,336, filed Apr. 1, 2019, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for multi-link setup between a multi-link AP logical entity and a multi-link non-AP logical entity.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
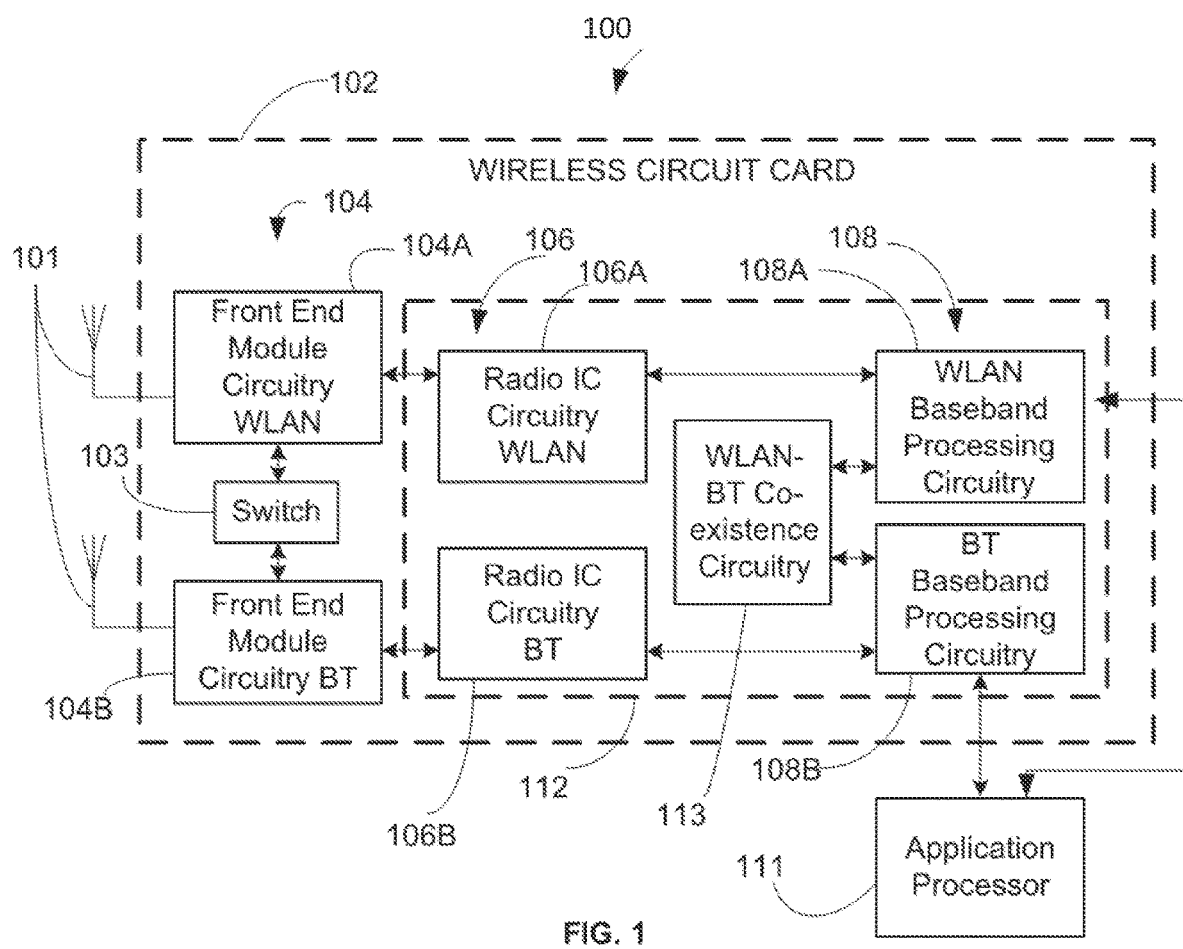
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.1 lac, and/or IEEE 802.11 ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
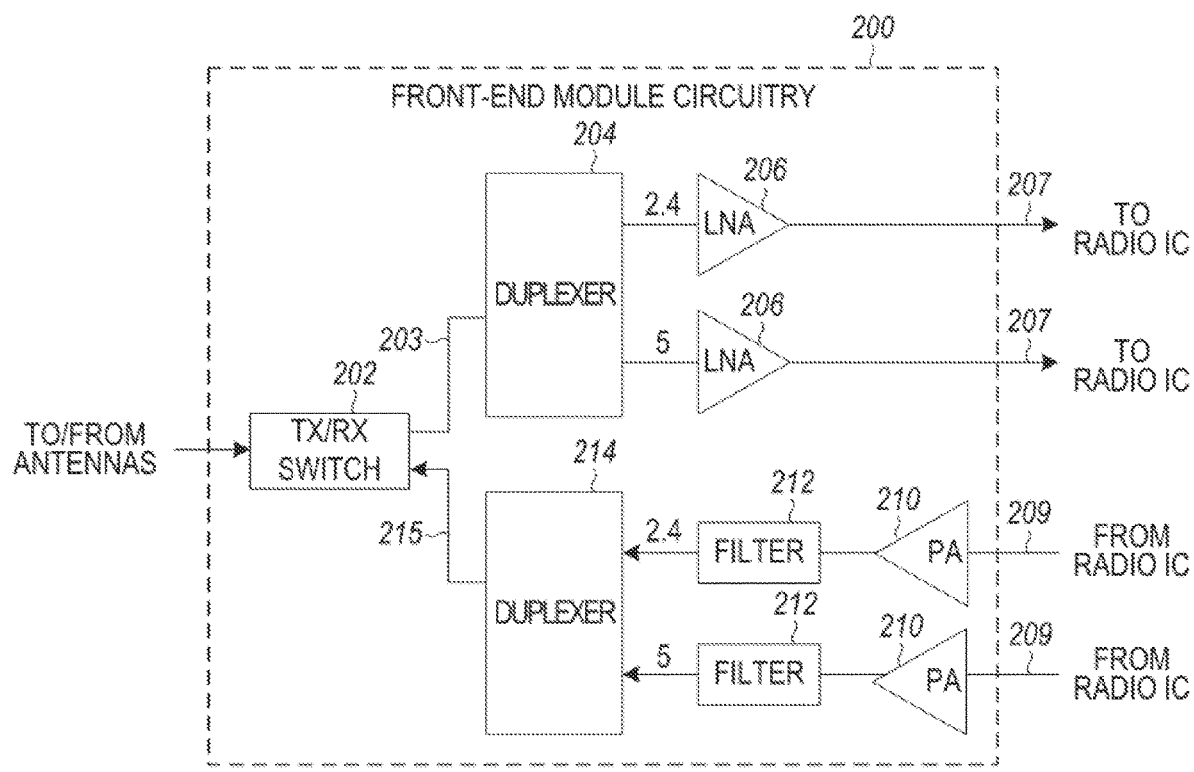
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
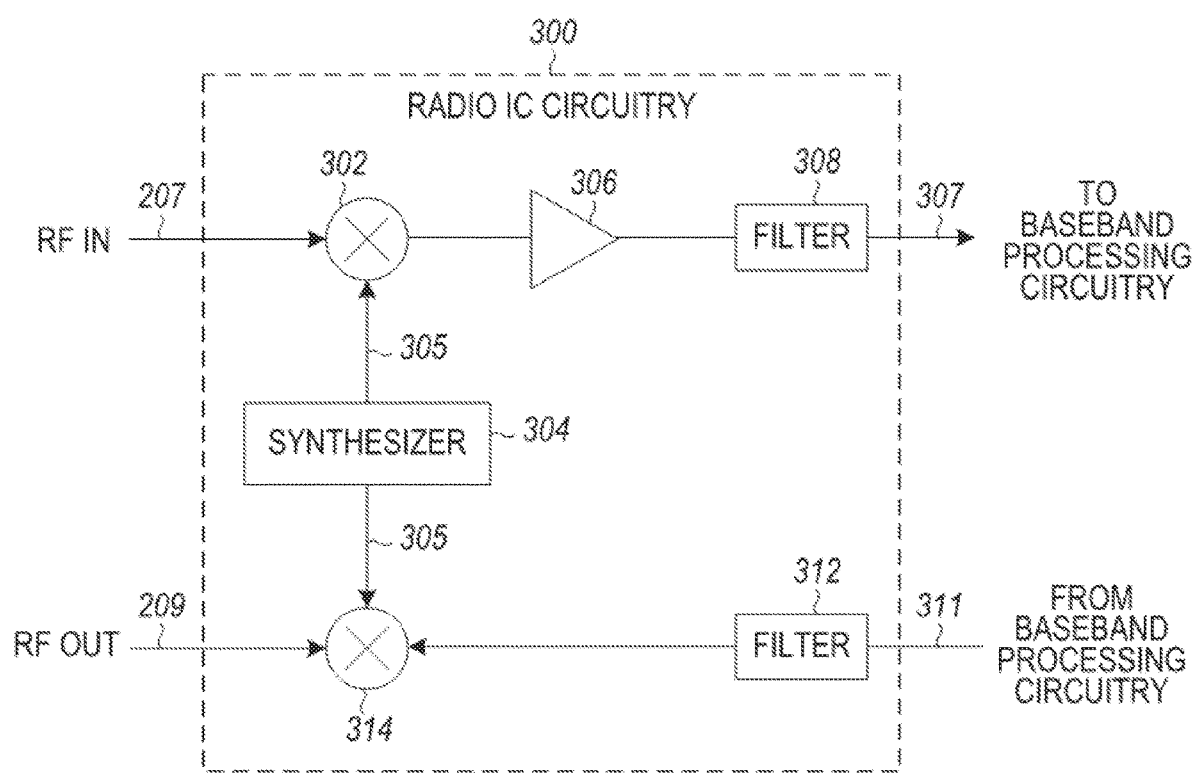
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
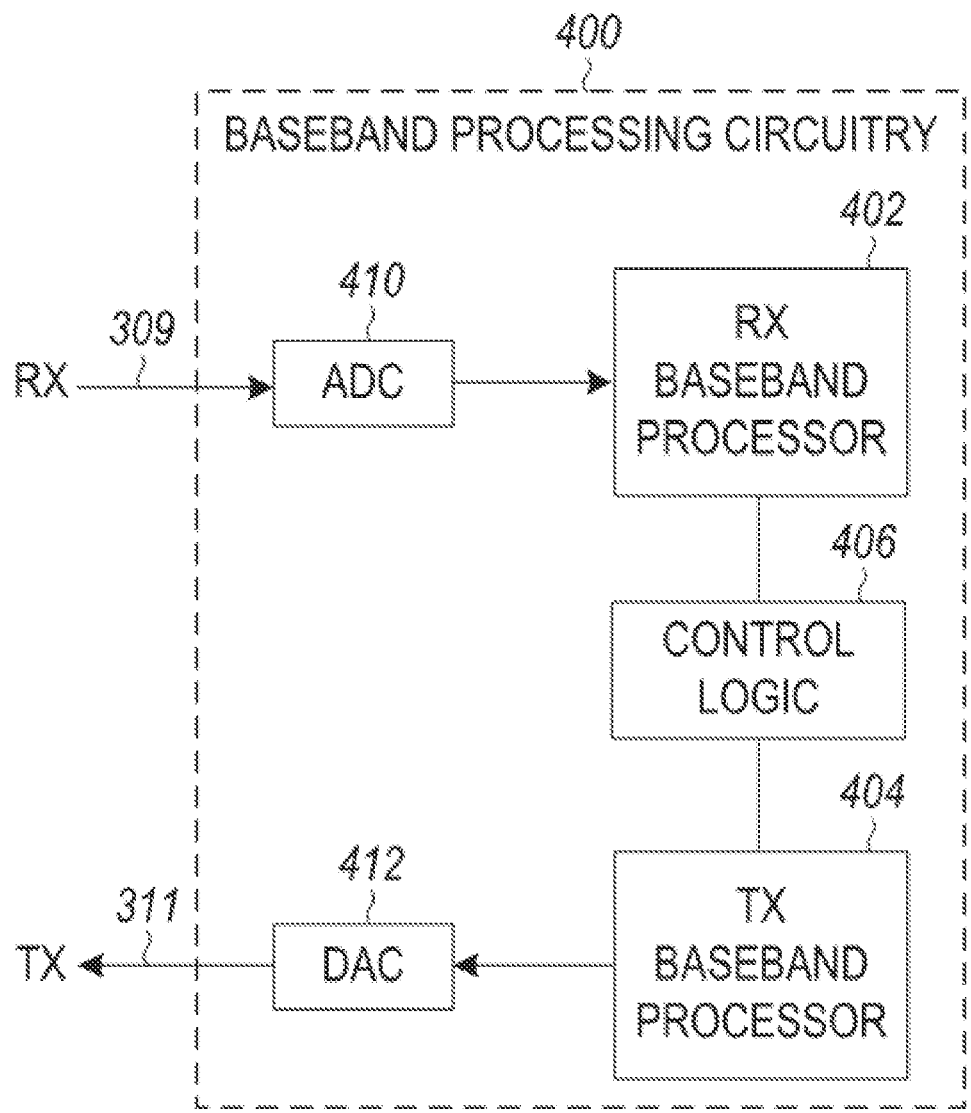
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
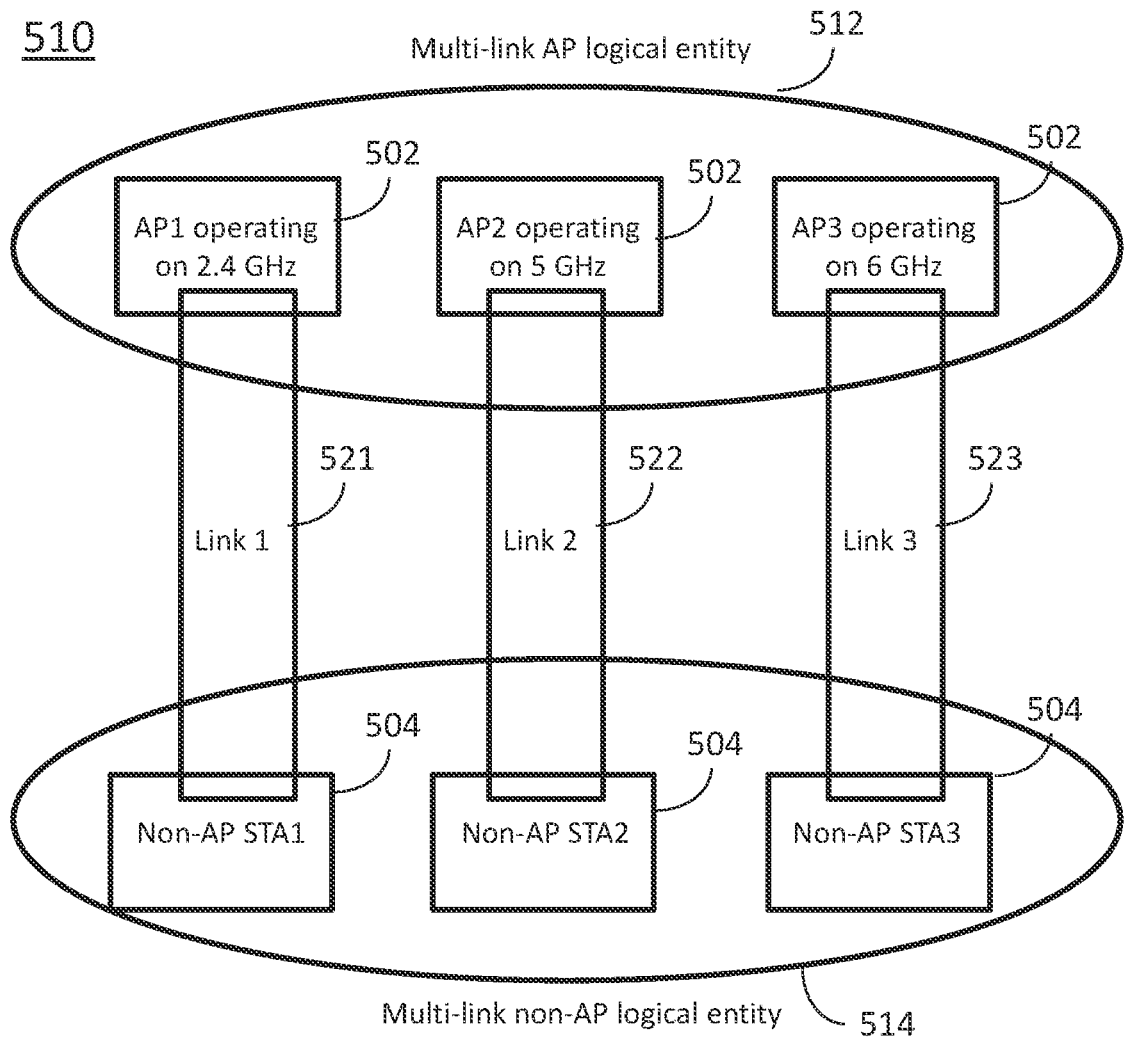
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. In some embodiments, the AP 502 may communicate with one or more of the STAs 504. Embodiments are not limited to a single AP 502, as the WLAN 500 may comprise one or more APs 502, in some embodiments.

In some embodiments, as shown in 510, multiple APs 502 may be included in a multi-link AP logical entity 512. In addition, multiple STAs 504 may be included in a multi-link non-AP logical entity 514.

In some embodiments, a "multi-link logical entity" is a logical entity that has one or more affiliated STAs. The logical entity has one MAC data service interface and primitives to the LLC and a single address associated with the interface, which can be used to communicate on the DSM. A "multi-link AP logical entity" is a multi-link logical entity, wherein each STA within the multi-link logical entity is an AP. A multi-link non-AP logical entity is a multi-link logical entity, wherein each STA within the multi-link logical entity is a non-AP STA. In some embodiments, a multi-link logical entity allows STAs (AP or non-AP STA) within the multi-link logical entity to have the same MAC address.

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.1 lax, EHT-related, and/or other. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502.

The AP 502 and/or the STAs 504 may operate in accordance with one or more of IEEE 802.11 a/b/g/n/ac/ad/af/ah/aj/ay, EHT, or another wireless communication standard. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol and/or EHT protocol.

The AP 502 may communicate with the STAs 504 in accordance with IEEE 802.11 communication techniques.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame may be configured for transmitting a number of spatial streams, which may be in accordance with MU-MIMO and may be in accordance with OFDMA. In other embodiments, the P 502, STA 504, and/or other device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with FIGS. 1-20.

In example embodiments, the STA 504 and/or the AP 502 are configured to perform the methods and operations/functions described herein in conjunction with FIGS. 1-20. In example embodiments, an apparatus of the STA 504 and/or an apparatus of the AP 502 are configured to perform the methods and functions described herein in conjunction with FIGS. 1-20. The term Wi-Fi may refer to one or more of the IEEE 802.11 communication standards.

Figure 6:
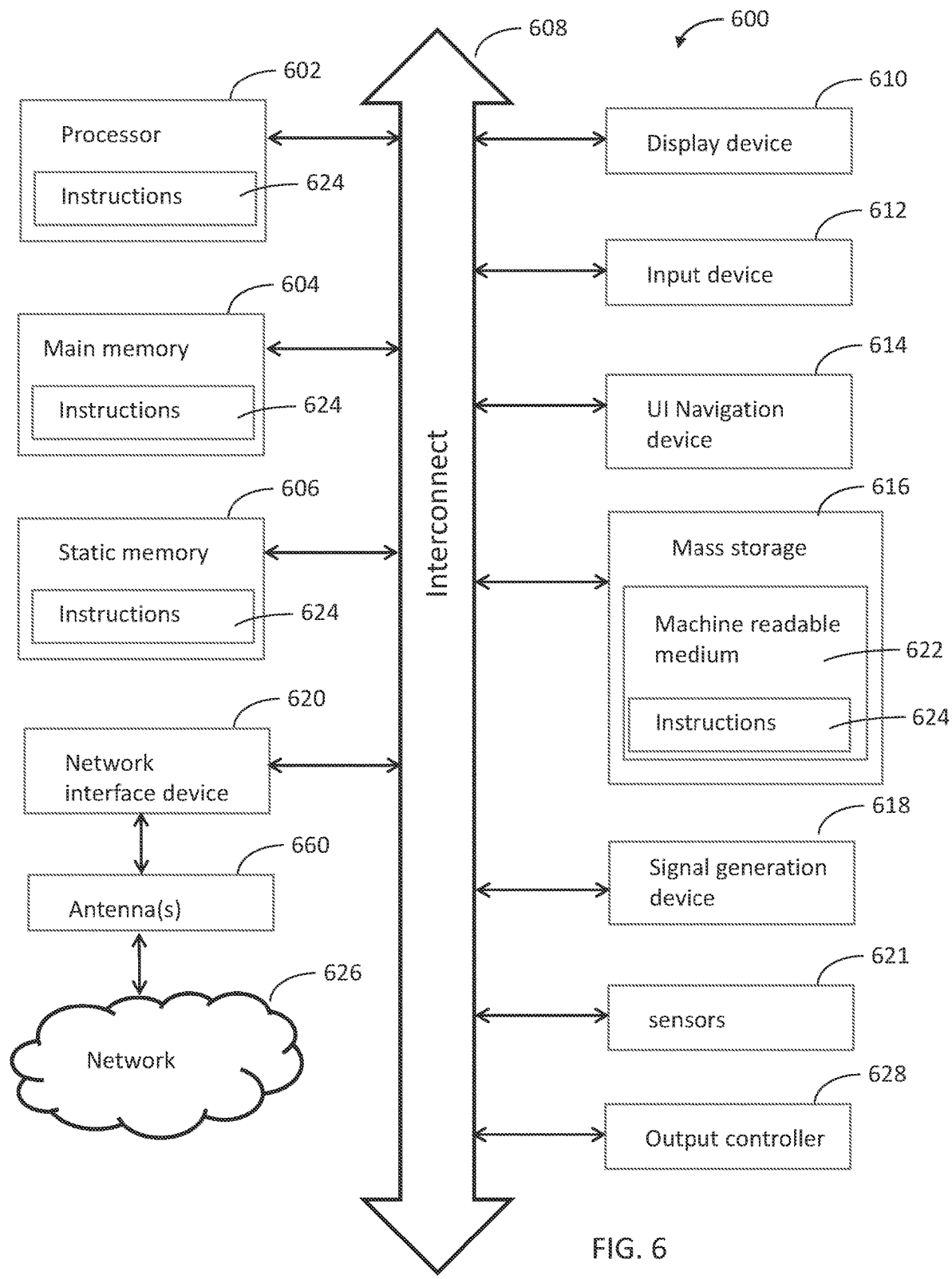
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks, magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM), random access memory (RAM); magnetic disk storage media; optical storage media; flash memory, etc.

Figure 7:
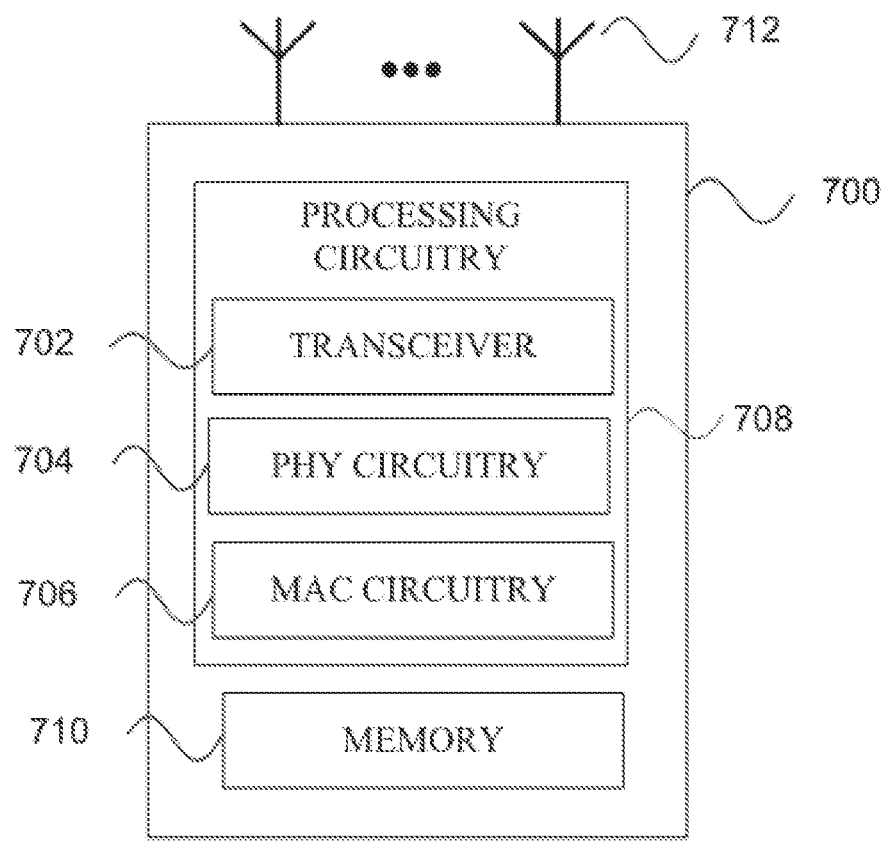
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the STAs 504 of FIG. 5 or wireless device 700) and an access point (e.g., the AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

In accordance with some embodiments, the AP 502 may be included in a plurality of APs 502 affiliated with a multi-link AP logical entity. As part of the multi-link AP logical entity, the APs 502 of the plurality of APs 502 may share a common medium access control (MAC) data service interface to an upper layer, wherein the common MAC data service interface is associated with a common MAC address. The AP 502 may exchange signaling with an STA 504 as part of a multi-link setup process between the multi-link AP logical entity and a multi-link non-AP logical entity. The STA 504 may be included in a plurality of STAs 504 affiliated with the multi-link non-AP logical entity. The multi-link setup process may establish a link between each AP 502 of the plurality of APs 502 and a corresponding STA 504 of the plurality of STAs 504. As part of the multi-link setup process, the AP 502 may receive, from the STA 504, a multi-link setup Request Frame that includes capability information of the STA 504 and capability information of the other STAs 504 of the plurality of STAs 504 or MAC addresses of the other STAs 504 of the plurality of STAs 504. The AP 502 may transmit, to the STA 504, a multi-link setup Response Frame that includes capability information of the AP 502 and capability information of the other APs 502 of the plurality of APs 502 or MAC addresses of the other APs 502 of the plurality of APs 502. These embodiments are described in more detail below.

Figure 8:
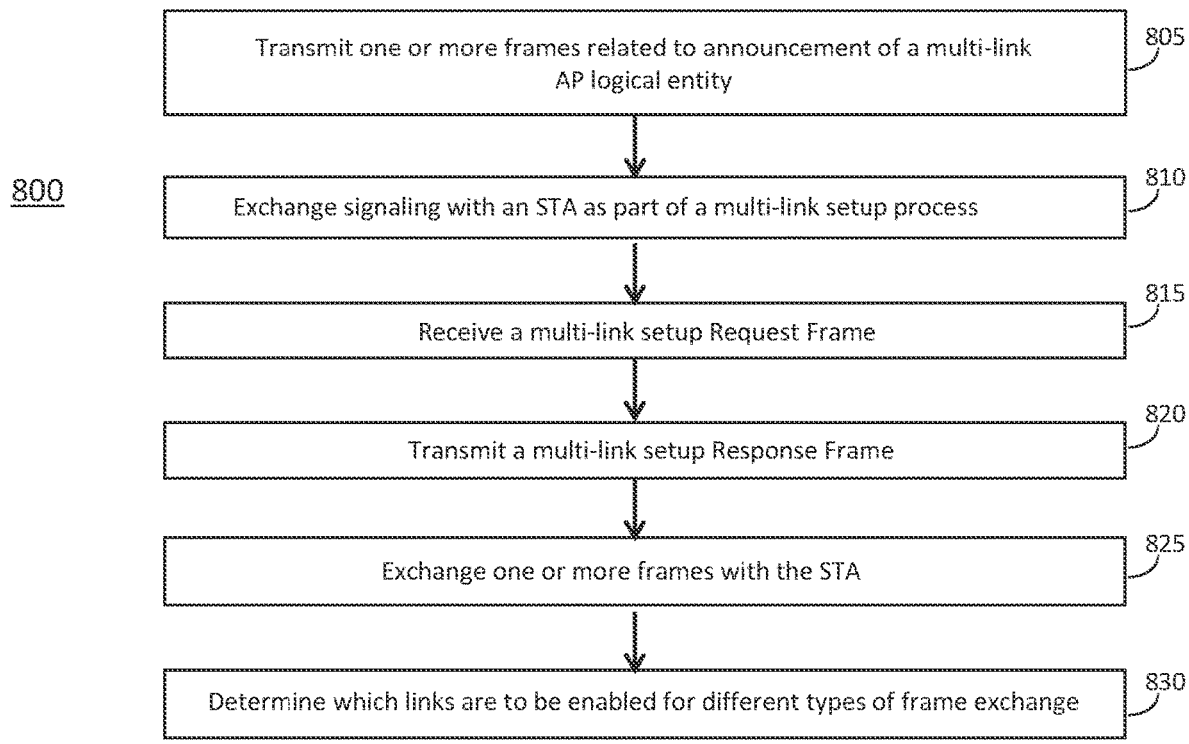
FIG. 8 illustrates the operation of a method in accordance with some embodiments.
Figure 9:
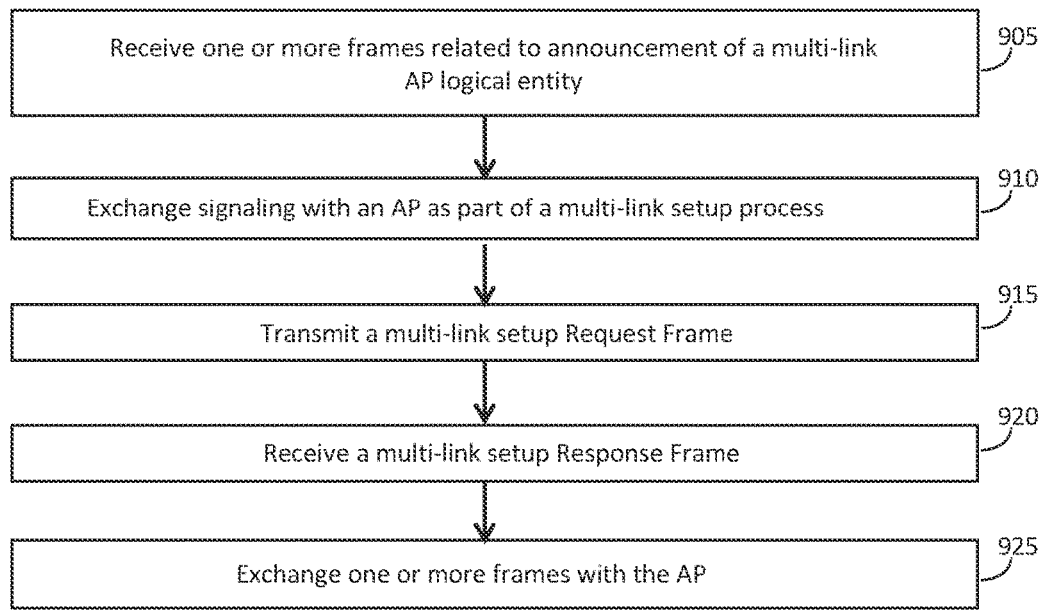
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the STA 504 may perform an operation that may be the same as, similar to, reciprocal to and/or related to an operation of the method 800, in some embodiments.

In some embodiments, an STA 504 may perform one or more operations of the method 900, but embodiments are not limited to performance of the method 900 and/or operations of it by the STA 504. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the AP 502 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the AP 502, and an operation of the method 900 may include reception of a same element (and/or similar element) by the STA 504. In some cases, descriptions of operations and techniques described as part of one of the methods 800, 900 may be relevant to the other method. Discussion of various techniques and concepts regarding one of the methods 800, 900 and/or other method may be applicable to one of the other methods, although the scope of embodiments is not limited in this respect.

The methods 800, 900 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 may also be applicable to an apparatus of an AP 502, an apparatus of a STA 504 and/or an apparatus of another device. In some embodiments, an apparatus of an AP 502 may perform one or more operations of the method 800 and/or other operations. In some embodiments, an apparatus of a STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the AP 502 may transmit one or more frames related to announcement of a multi-link AP logical entity. At operation 810, the AP 502 may exchange signaling with an STA 504 as part of a multi-link setup process. At operation 815, the AP 502 may receive a multi-link setup Request Frame. At operation 820, the AP 502 may transmit a multi-link setup Response Frame. At operation 825, the AP 502 may exchange one or more frames with the STA 504. At operation 830, the AP 502 may determine which links are to be enabled for different types of frame exchange.

It should be noted that some or all of the signaling (including but not limited to the signaling of operation 810 and the frames of operations 815 and 820) may be exchanged between the AP 502 and the STA 504, but may not necessarily be part of a multi-link setup process or other process, in some embodiments.

In some embodiments, the AP 502 may be included in a plurality of APs 502 affiliated with a multi-link AP logical entity. As part of the multi-link AP logical entity, the APs 502 of the plurality of APs 502 may share a common medium access control (MAC) data service interface to an upper layer, wherein the common MAC data service interface is associated with a common MAC address. The AP 502 may exchange signaling with an STA 504 as part of a multi-link setup process between the multi-link AP logical entity and a multi-link non-AP logical entity. The STA 504 may be included in a plurality of STAs 504 affiliated with the multi-link non-AP logical entity. The multi-link setup process may establish a link between each AP 502 of the plurality of APs 502 and a corresponding STA 504 of the plurality of STAs 504. As part of the multi-link setup process, the AP 502 may receive, from the STA 504, a multi-link setup Request Frame that includes capability information of the STA 504 and capability information of the other STAs 504 of the plurality of STAs 504 or MAC addresses of the other STAs 504 of the plurality of STAs 504. The AP 502 may transmit, to the STA 504, a multi-link setup Response Frame that includes capability information of the AP 502 and capability information of the other APs 502 of the plurality of APs 502 or MAC addresses of the other APs 502 of the plurality of APs 502.

In some embodiments, the multi-link setup process may enable the multi-link AP logical entity to serve as an interface between a distribution system (DS) and the multi-link non-AP logical entity.

In some embodiments, the AP 502 may transmit, before the multi-link setup process, one or more frames to advertise the multi-link AP logical entity. The AP 502 may encode the one or more frames to include one or more of: information that identifies the APs 502 of the plurality of APs 502; capability information of the APs 502 of the plurality of APs 502; and/or other.

In some embodiments, the AP 502 may transmit, before the multi-link setup process, one or more frames to advertise the multi-link AP logical entity. In some embodiments, the AP 502 may encode the one or more frames to indicate which AP 502 of the plurality of APs 502 is to serve as an exclusive point of contact for the multi-link setup process.

In some embodiments, the AP 502 may encode the multi-link setup Response Frame to include one or more of: per-link identifiers of each of the links established by the multi-link setup process; per-link configuration information of each of the links established by the multi-link setup process; and/or other. In some embodiments, for at least one of the links established by the multi-link setup process, the per-link configuration information of the link may include one or more of: an operating class; a channel number; a primary channel, a basic service set (BSS) configuration of the corresponding AP 502; and/or other.

In some embodiments, the AP 502 may determine, during or after successful completion of the multi-link setup process, which links established by the multi-link setup process are to be enabled for class 2 and class 3 frame exchange after the multi-link setup process.

In some embodiments, the capability information of the other APs 502 may include per-link capability information for at least one of the links, including one or more of: a maximum number of links that can be enabled for operation at a time; on each of the links that are enabled for frame exchange, whether the links are to support transmission on both sides of the link, reception on both sides of the link, or both transmission and reception on both sides of the link; and/or other.

In some embodiments, the AP 502 may exchange signaling with the STA 504 to indicate multiple traffic identifiers (TIDs) for traffic supported by the links to enable different quality-of-service (QoS) for at least some of the links.

In some embodiments, the capability information of at least one of the other STAs 504 may include one or more of: a transmit power constraint; a number of spatial streams supported; a supported bandwidth; capability information related to one or more of high throughput (HT) operation capability, very high throughput (VHT) operation capability, extremely high throughput (EHT) operation capability, and/or high efficiency (HE) operation capability; and/or other.

In some embodiments, the multi-link setup Request Frame may include the common MAC address associated with the MAC data service interface of the multi-link non-AP logical entity to the upper layer. In some embodiments, the multi-link setup Response Frame may include the common MAC address associated with the MAC data service interface of the multi-link AP logical entity to the upper layer. In some embodiments, one or more other messages/frames may include a common MAC address associated with the multi-link AP logical entity. In some embodiments, one or more other messages/frames may include a common MAC address associated with the multi-link non-AP logical entity.

In some embodiments, the AP 502 may be configured to operate in a frequency band that is different from a frequency band of at least one of the other APs 502 of the plurality. In some embodiments, the AP 502 may be co-located with at least one of the other APs 502 of the plurality. In some embodiments, the AP 502 may be non-co-located with at least one of the other APs 502 of the plurality. In some embodiments, processing circuitry may be configured to perform operations for the AP 502 and operations for at least one other AP 502 of the plurality of APs 502.

In some embodiments, an apparatus of an AP 502 may comprise memory. The memory may be configurable to store at least a portion of the multi-link setup Request Frame. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the multi-link setup Request Frame. The apparatus may include a transceiver to receive the multi-link setup Request Frame. The transceiver may transmit and/or receive other blocks, messages and/or other elements.

At operation 905, the STA 504 may receive one or more frames related to announcement of a multi-link AP logical entity. At operation 910, the STA 504 may exchange signaling with the AP 502 as part of a multi-link setup process. At operation 915, the STA 504 may transmit a multi-link setup Request Frame. At operation 920, the STA 504 may receive a multi-link setup Response Frame. At operation 925, the STA 504 may exchange one or more frames with the AP 502.

It should be noted that some or all of the signaling (including but not limited to the signaling of operation 910 and the frames of operations 915 and 920) may be exchanged between the AP 502 and the STA 504, but may not necessarily be part of a multi-link setup process or other process, in some embodiments.

In some embodiments, the STA 504 may be included in a plurality of STAs 504 affiliated with a multi-link non-AP logical entity. As part of the multi-link non-AP logical entity, the STAs 504 of the plurality of STAs 504 share a common medium access control (MAC) data service interface to an upper layer. The common MAC data service interface may be associated with a common MAC address. The STA 504 may exchange signaling with an AP 502 as part of a multi-link setup process between a multi-link AP logical entity and a multi-link non-AP logical entity. The AP 502 may be included in a plurality of APs 502 affiliated with the multi-link AP logical entity. The multi-link setup process may establish a link between each AP 502 of the plurality of APs 502 and a corresponding STA 504 of the plurality of STAs 504. As part of the multi-link setup process, the STA 504 may transmit, to the AP 502, a multi-link setup Request Frame that includes capability information of the STAs 504 of the plurality of STAs 504; and receive, from the AP 502, a multi-link setup Response Frame that includes capability information of the APs 502 of the plurality of APs 502.

In some embodiments, the STA 504 may receive one or more frames that advertise the multi-link AP logical entity. The one or more frames may be received from the AP 502 before the multi-link setup process. The one or more frames may include one or more of: information that identifies the APs 502 of the plurality of APs 502; the capability information of the APs 502 of the plurality of APs 502: and/or other.

In some embodiments, an apparatus of an STA 504 may comprise memory. The memory may be configurable to store at least a portion of the multi-link setup Request Frame. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the multi-link setup Request Frame. The apparatus may include a transceiver to transmit the multi-link setup Request Frame. The transceiver may transmit and/or receive other blocks, messages and/or other elements.

Figure 10:
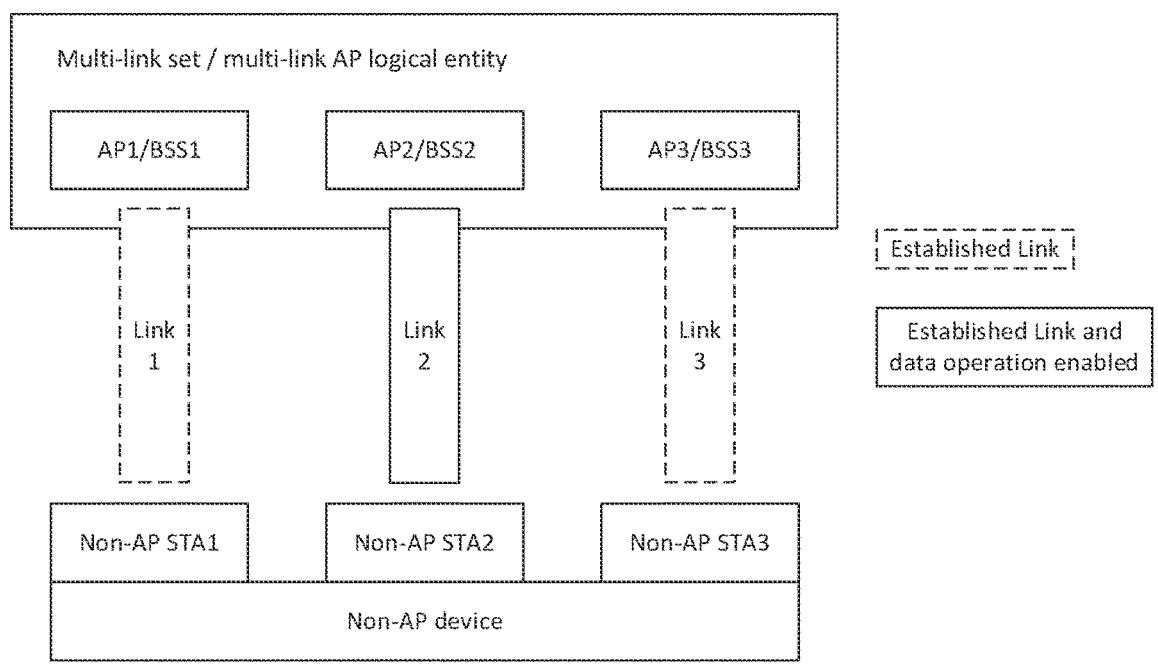
FIG. 10 illustrates an example of a multi-link arrangement in accordance with some embodiments.
Figure 11:
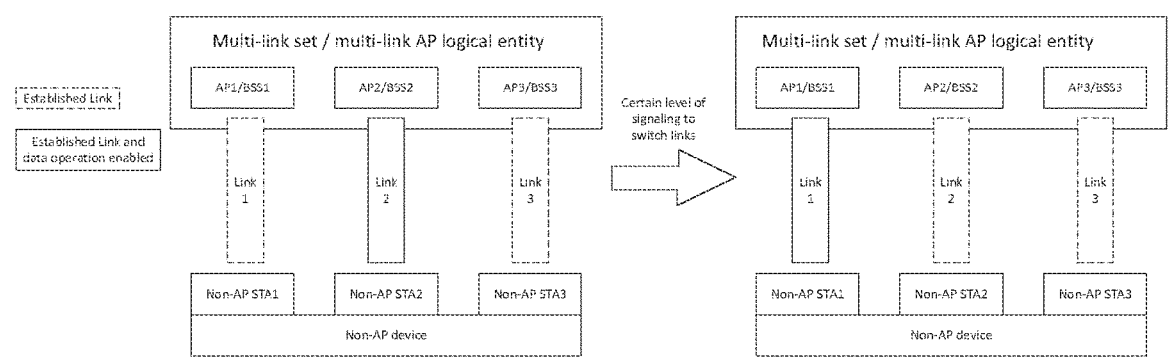
FIG. 11 illustrates an example of link switching for a multi-link arrangement in accordance with some embodiments.
Figure 12:
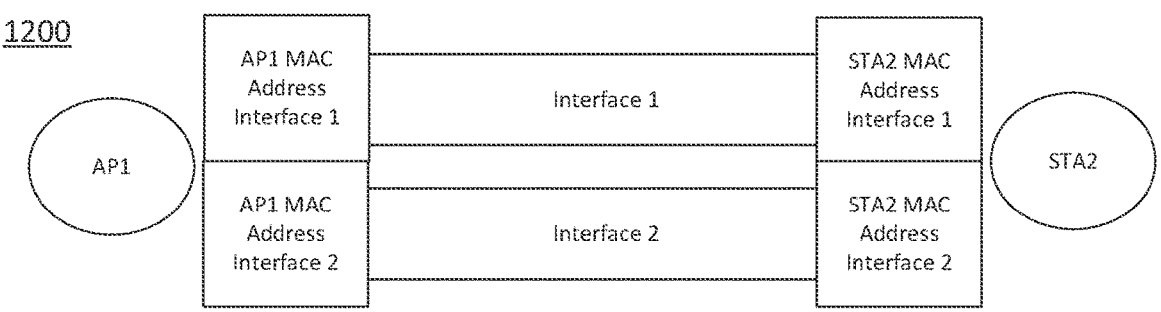
FIG. 12 illustrates example arrangements of addresses in accordance with some embodiments.
Figure 13:
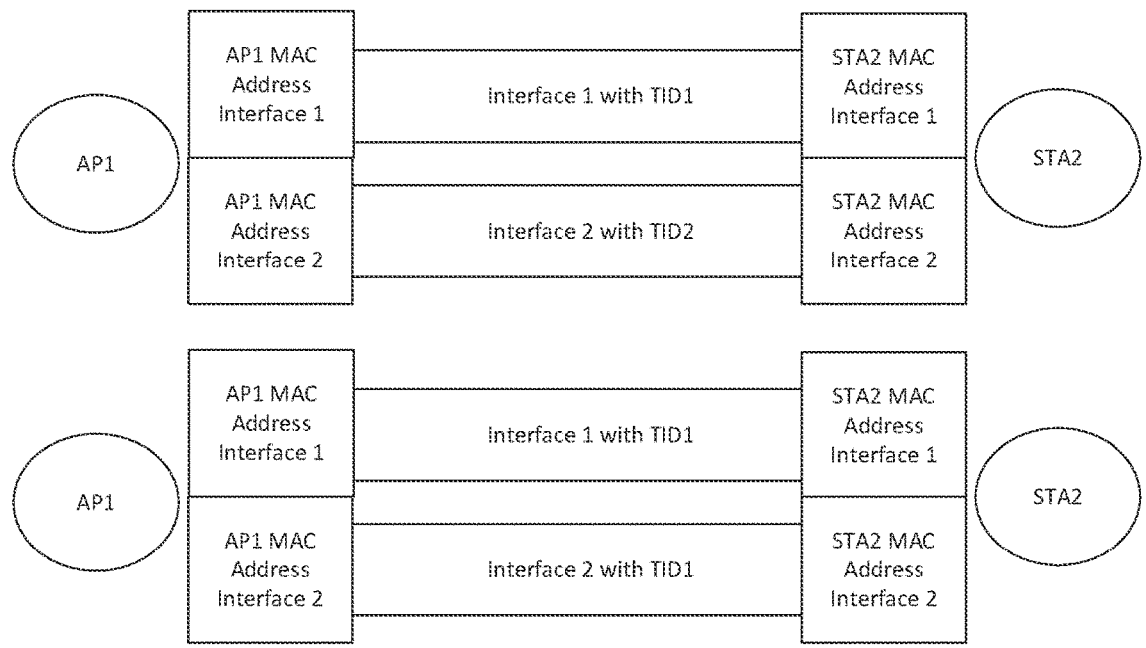
FIG. 13 illustrates example arrangements of addresses in accordance with some embodiments.
Figure 14:
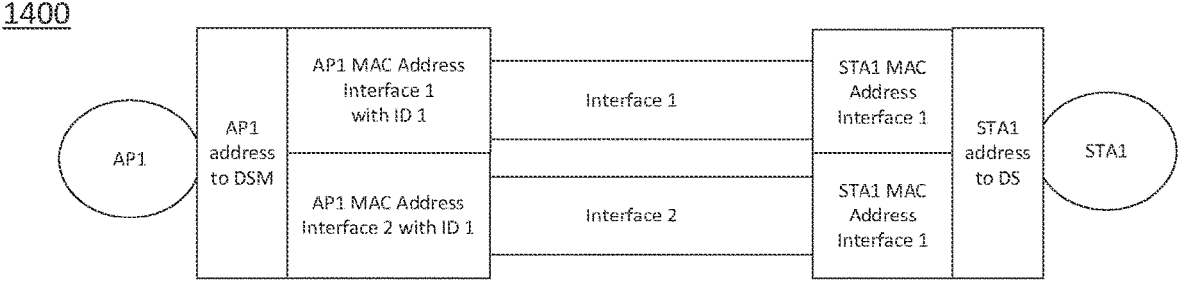
FIG. 14 illustrates example arrangements of addresses in accordance with some embodiments.
Figure 15:
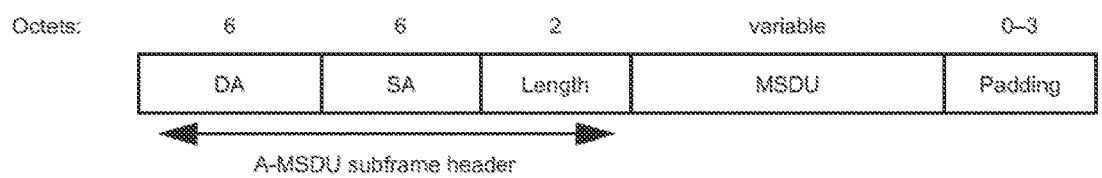
FIG. 15 illustrates an example subframe structure in accordance with some embodiments.
Figure 16:
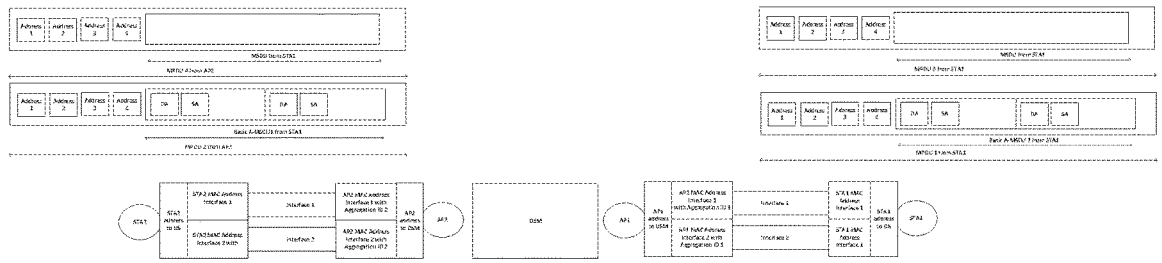
FIG. 16 illustrates an example for address setting in accordance with some embodiments.
Figure 17:
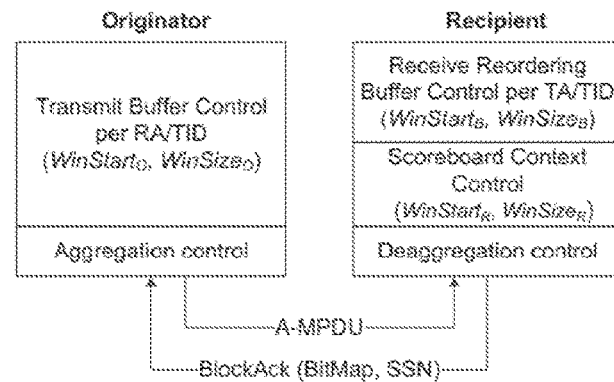
FIG. 17 illustrates example parameters related to block acknowledgement (BA) in accordance with some embodiments.
Figure 18:
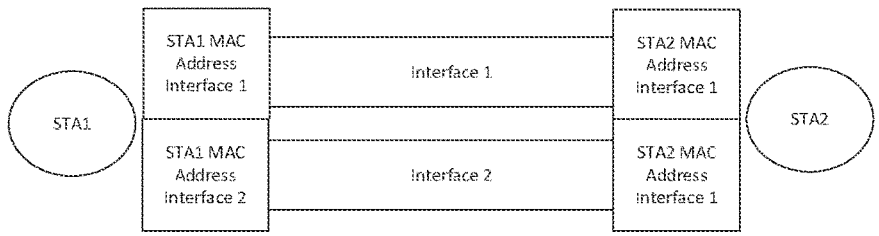
FIG. 18 illustrates an example for address setting in accordance with some embodiments.
Figure 19:
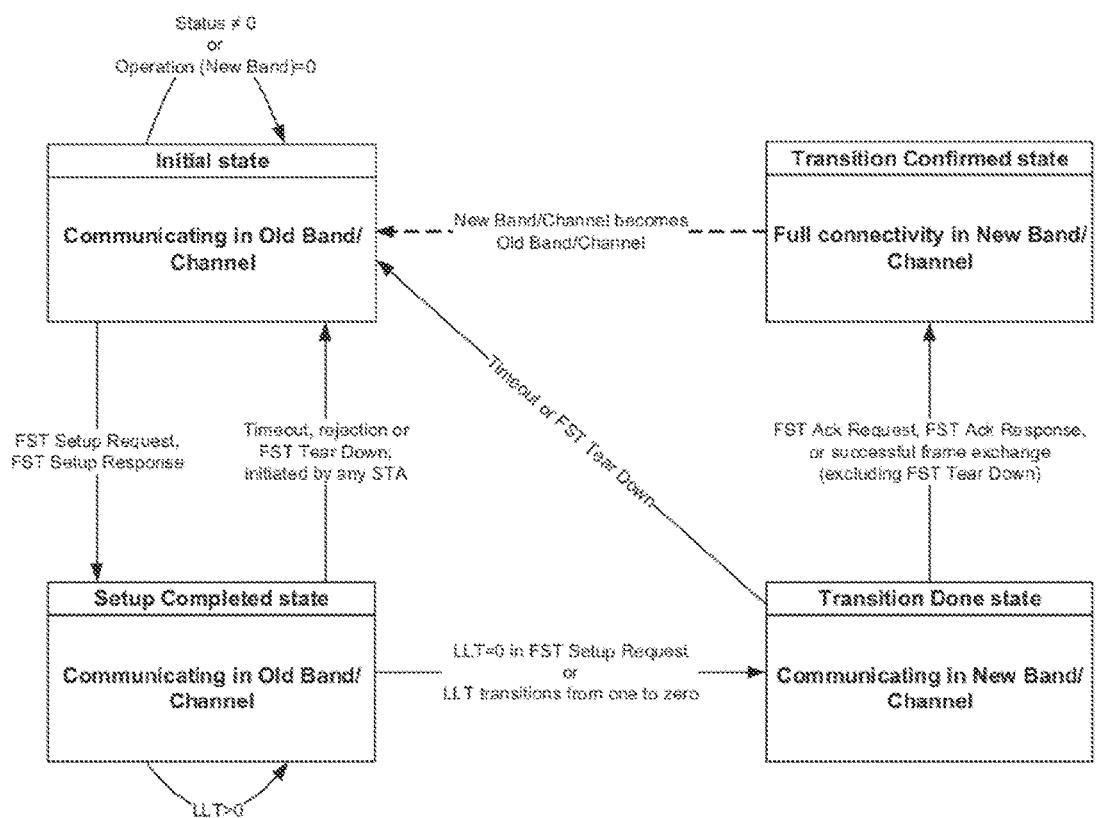
FIG. 19 illustrates an example state diagram for an FST setup protocol in accordance with some embodiments.
Figure 20:
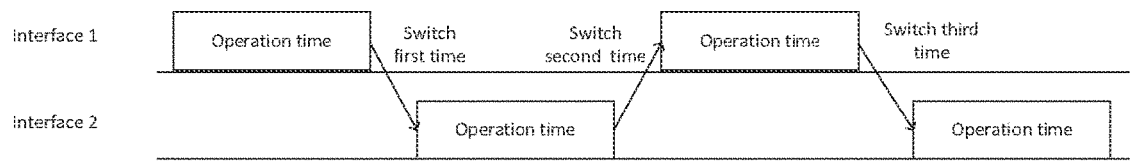
FIG. 20 illustrates an example of switching in accordance with some embodiments.

FIG. 10 illustrates an example of a multi-link arrangement in accordance with some embodiments. FIG. 11 illustrates an example of link switching for a multi-link arrangement in accordance with some embodiments. FIG. 12 illustrates example arrangements of addresses in accordance with some embodiments. FIG. 13 illustrates example arrangements of addresses in accordance with some embodiments. FIG. 14 illustrates example arrangements of addresses in accordance with some embodiments. FIG. 15 illustrates an example subframe structure in accordance with some embodiments. FIG. 16 illustrates an example for address setting in accordance with some embodiments. FIG. 17 illustrates example parameters related to block acknowledgement (BA) in accordance with some embodiments. FIG. 18 illustrates an example for address setting in accordance with some embodiments. FIG. 19 illustrates an example state diagram for an FST setup protocol in accordance with some embodiments. FIG. 20 illustrates an example of switching in accordance with some embodiments.

It should be noted that the examples shown in FIGS. 10-20 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-20. Although some of the elements shown in the examples of FIGS. 10-20 may be included in a WLAN standard, Wi-Fi standard, 802.11 standard, and/or other standard, embodiments are not limited to usage of such elements that are included in standards.

In some embodiments, multi-link association with APs 102 in a multi-link set may be used. It should be noted that references herein to "multi-link association" and to "multi-link setup" are not limiting. For instance, in some of the descriptions herein, one or more techniques, operations and/or methods may be performed as part of a multi-link setup. It is understood that one or more of those techniques, operations and/or methods may be performed as part of a multi-link association, as part of another process or otherwise, in some embodiments.

In addition, in some of the descriptions herein, one or more techniques, operations and/or methods may be performed as part of a multi-link association. It is understood that one or more of those techniques, operations and/or methods may be performed as part of a multi-link setup, as part of another process or otherwise, in some embodiments.

In addition, in some descriptions herein, one or more techniques, operations and/or methods may be performed as part of a process. It is understood that one or more of those techniques, operations and/or methods may be performed as part of another process, in some embodiments. In addition, one or more of those techniques, operations and/or methods may be performed, but may not necessarily be related to any particular process, in some embodiments.

In some embodiments, an association framework may work for multiple APs 102 which are collocated in an AP device that supports simultaneous operations to one or more non-AP devices. Between the AP 102 device and one non-AP device, there are different interfaces, where each interface is defined by 3 tuples: the BSS configuration of the AP 102, AP info (like MAC address), and STA info (like MAC address).

In some embodiments, an association framework defined in AB4331 helps to figure out two important functionalities of association: routing and capability exchange of different interfaces. Specifically, for routing, the association modifies the existing question of "Which AP is serving STA X?" to "which AP device is serving STA device X?"

In some embodiments, multi-band activation signaling may be used. In some embodiments, a non-AP device can have several interfaces with an AP device. The non-AP device and the AP device can decide which interface to use or not to use (which may be referred to as "activated" in some cases) at a specific time based on various signaling.

Some embodiments may be related to collocated APs 102 in an AP device and for simultaneous operation of non-AP devices to achieve seamless operation between the AP device and the non-AP device. However, in a more general setting, both assumptions are not needed. The seamless operation for management and data plane can still help when non-AP device does not support simultaneous operation across interfaces. The seamless operation for management and data plane can also help when APs are not in a collocated AP device, and we will then have a more efficient roaming operation without the need of renegotiation.

In some cases, the signaling may not necessarily consider the case that there are stages that an interface has not achieved capability exchange due to the reason that the non-AP device has not been able to reach the AP if we consider the case not only for collocated AP.

In some embodiments, a framework of association may be extended for multi-band operation. In some embodiments, one or more association techniques may be extended by building multiple interface/link association contexts for BSSs/APs in a multi-interface/multi-link set.

It should be noted that the term "multi-link set" may be used in some descriptions herein, but the scope of embodiments is not limited by this terminology. Other terminology may be used, in some cases, including but not limited to: a multi-link logical entity, a multi-link AP logical entity, a multi-link non-AP logical entity, and/or other. In some descriptions herein, the term "multi-link set" may be replaced by one of the above terms. In some descriptions herein, one of the above terms may be replaced by the term "multi-link set." In some cases, a concept described herein for a multi-link set may be applicable to one or more of the above. For instance, a multi-link set may include multiple APs in a description herein, and it is understood that the same description may be applicable to a multi-link AP logical entity that includes multiple APs, in some embodiments.

It should be noted that the terminology "link" may be used to better align with the IEEE P802.1AX-Rev/D1.1 Bridges and Bridged Networks Link Aggregation, where each MAC and PHY interface is viewed as a link. However, we note that the definition of a link/interface in 802.11 context may still be defined, in some embodiments, by 3 tuples: the BSS configuration of the AP, AP info (like MAC address), and STA info (like MAC address). In some descriptions herein, we use the term "link", but the definition may be essentially the same as an interface in some cases. Note that other terms maybe used for the concept of the 3 tuples, but the concept covered by some embodiments described herein still holds.

The multi-link set is defined in a general term such that collocated APs/BSSs or non-collocated APs/BSSs can be in the set. The association framework allows a non-AP device to have a single frame exchange to associate with any APs in a multi-link set and exchange information of different links (ex. BSS configuration, AP information of each link, non-AP STA information of each link, capability of each link, Tx/Rx constraints of different links).

In some embodiments, one or more APs in the multi-link set can indicate the information of multi-link set. In some embodiments, one or more links can be established at a specific time, where the term "established" of a link means that: the AP device has all the information to enable data operation with the non-AP device in that link; the non-AP device has all the information to enable data operation with the AP device in that link. Note that other terms maybe used for the concept for both sides to have all the necessary information of a link, but the concept covered by this IDF still holds.

In some embodiments, depending on the exchange Tx/Rx constraints of different links, among the established links, both the AP device and non-AP device agree to start data operation in certain set of the established links based on switching/power save. In some embodiments, a common device address used for DS mapping will be signaled by the non-AP EHT STA when associated APs in a multi-link set. In some embodiments, the common device address is a MAC address that can be used by the distribution system (DS) to transfer the packets. In some embodiments, all the EHT APs in a multi-link set will have a common address used to access distribution system medium (DSM), and it can be up to implementation how APs (collocated or non-collocated) in a multi-link set will achieve this.

A non-limiting example 1000 is shown in FIG. 10.

In some embodiments, one or more of the techniques, operations and/or methods described herein may be applicable to a general scenario. In some embodiments, APs/

BSSs in the multi-link set can be collocated or non-collocated. In some embodiments, a non-AP device can negotiate Tx/Rx constraints across the link and is not limited to have support for simultaneous operation across links.

In some embodiments, an indication on multi-link set may be used. In some embodiments, one or more APs 502 in a multi-link set can advertise the members of APs/BSSs in the multi-link set. An element, say multi-link element, can be designed for this purpose. In some embodiments, a non-AP device can have multi-link associations with multiple APs/BSSs in a multi-link set. In some embodiments, the multi-link association can be one management frame exchange with any APs 502 or specific APs in the multi-link set. In some embodiments, the frame exchange can include multi-link association request/response frame. In some embodiments, each link is identified by a 3 tuples of the BSS configuration of the AP 502, AP info (like MAC address), and STA info (like MAC address, and the device address of the non-AP device that includes the STA for the link). In some embodiments, each link can be assigned a link ID for the multi-link set, and the information can be included in the element.

In some embodiments, for the multi-link association exchange, the request frame from the non-AP device can include one or more of: the information of the multi-link set; its capability of some or all links (like bandwidth, number of supported spatial streams supported mechanism and PPDU formats like mechanism and PPDU formats designed by non-HT, HT, VHT, HE, and so on); the capability of some links maybe exactly the same, and there can be indication to indicate inheritance of capability of link 2 from the capability of link 1; the inheritance of capability can be based on elements (for instance, some elements for link 2 is inherited from elements for link 1); non-AP STA device information like MAC address of some or all links; listen interval (how often to check beacons) for one or more beacons from APs 102 in the multi-link set; a non-AP STA device address used by the APs in the multi-link set for DS routing (in some embodiments, an address consideration described herein may be used, although the scope of embodiments is not limited in this respect); Tx/Rx constraints across the link (for example, only one or more link can be used at a specific time; as another example, among the links that are used, there must be Tx alignment or Tx alignment across the link); other elements that maybe included in current association request (see Table 9-36-Association Request frame body) for different links.

In some embodiments, for the multi-link association exchange, the response frame from the AP that receives the request or any specific AP 102 in the multi-link set can include one or more of: its capability of some or all links (like bandwidth, number of supported spatial stream, supported mechanism and PPDU formats like mechanism and PPDU formats designed by non-HT, HT, VHT, HE, and so on); non-AP STA information like MAC address of some or all links; Tx/Rx constraints across the link (for one possibility, among the links that are used, there must be Tx alignment or Rx alignment across the links; for another possibility, what are the maximum links that can be enabled for operation at a time (i.e. concurrent operation)); AID assignment for the non-AP STA per link; EDCA parameter set in different links; other elements that maybe included in current association response (see Table 9-37—Association Response frame body) for different links.

In some embodiments, there can be separate follow up frame exchange for each link to complete. Examples include, but are not limited to: RSNA frame exchange to figure out the key assignment of each link; mechanism specific frame exchange like TWT to figure out mechanism specific operation of each link; frame exchange to figure out the capability on both sides (AP and non-AP STA) of each link.

In some embodiments, after all the exchange, one or more links can be established at a specific time, where the term "established" of a link means that: the AP 102 has all the information to enable data operation with the non-AP device in that link, and that the non-AP device has all the information to enable data operation with the AP in that link.

In some embodiments, after all the exchange, depending on the exchange Tx/Rx constraints of different links, among the established links, both the APs in the multi-link set and non-AP device agree to start data operation in certain set of the established links based on switching/power save signaling. A non-limiting example 1100 is shown in FIG. 11.

In some embodiments, the signaling can be tied to specific link ID to indicate one or more links is enabled/resumed/activated for operation while other links are disabled/suspended/deactivated for operation. Note that the name that will be used in the standard to describe the concept of using or not using a specific link maybe changed. However, the concept and signaling proposed to support the concept can still be reused. In some embodiments, signaling defined herein may be used, although the scope of embodiments is not limited in this respect.

In some embodiments, non-AP device does not need to repeat any negotiation (ex. association, or negotiation for any mechanism) when switch to a set of specific link with any signaling if the negotiation has been done before for the set of specific links.

In some embodiments, AP 102 in the specific link will use the corresponding agreement like AID assignment, capability exchange to perform the transmission in the link to the non-AP STA of the non-AP device.

In some embodiments, non-AP device can start any missing negotiation (ex. negotiation for any mechanism) when switch to a set of specific link with any signaling if the negotiation has not been done before for the set of specific links.

In some embodiments, multi-band aggregation may be used. Multi-band operation has been one of the topics that will be studied by the new EHT technical group. Specifically, the idea of allowing a non-AP EHT STA to operate in two bands simultaneously has been the focus to increase peak throughput. An example 1200 is shown in FIG. 12. Two may be considered for Multi-band Aggregation: Case 1, with different TID streams on different interfaces (each TID on a single interface); and Case 2, with same TID stream on multiple interfaces. An example 1300 for these two cases is shown in FIG. 13.

Note that when considering aggregation, we currently consider the scenarios that AP1 may use different or same MAC address on different interfaces. Similarly, we consider the scenarios that STA2 may use different MAC addresses (in case of concurrent operation) or same MAC address (for non-concurrent operation) on different interfaces.

A typical scenario is that AP1 uses different MAC addresses on different interfaces and view the implementation like Co-located EHT APs. For non-AP EHT STA2, a typical scenario is that non-AP EHT STA2 uses same MAC address on different interfaces for non-concurrent or concurrent operation on different interfaces. However, other scenarios are considered in this IDF since different scenarios may link to different implementation of multi-band operation. For example, non-AP EHT STA2 may actually be part of another "Subordinate AP" that tries to form backhaul connection with EHT AP1. As a result, different MAC addresses may be used. As another example, AP1 may be part of another non-AP EHT STA to form P2P connection, which may use same MAC address on both interfaces.

Note that the scenario can be extended to more than 2 interfaces between EHT devices, and we should consider the general scenarios where same/different MAC addresses maybe used on different interfaces.

In some embodiments, a distributed system (DS) included in an IEEE 802.11 standard (including but not limited to an 802.11-2016 standard) may be related to some embodiments.

In some embodiments, one or more of the following elements may be used: source address (SA), destination address (DA), transmitter address (TA), receiver address (RA). One or more of those elements may be included in an 802.11 standard, although the scope of embodiments is not limited in this respect.

In some embodiments, a STA uses association to identify the mapping among DS. In some cases, when multi-band aggregation operation is done, a device may then need to associate with multiple APs simultaneously to get AID assignment and enable operation on specific band, which is not aligned with current 802.11 architecture.

In some embodiments, one or more techniques, operations and/or methods to enable multiple associations simultaneously for multi-band aggregation may be used.

In some embodiments, a current association context may be revised by building multiple interface associations context on top of the existing association context and preserve the existing definitions for DS as currently defined in 802.11. In some embodiments, EHT AP indicates which interface can be aggregated together by providing an ID. In some embodiments, a non-AP EHT STA is allowed to associate with different APs on different interfaces with same/different MAC addresses as long as the same ID is used. In some embodiments, STA indicates to the AP the interfaces that will have aggregation. In some embodiments, a common device address used for DS mapping will be signaled by the non-AP EHT STA when associated APs on different interfaces has the same ID. In some embodiments, the common device address is a MAC address that can be used by the DS to transfer the packets. Essentially, it is the SA or DA.

In some embodiments, all the EHT APs on different interfaces with the same ID will have a common address used to access DSM. In some embodiments, the ID mentioned above can be the common address provided by EHT AP to DSM when a non-AP EHT STA with aggregation capability has multiple associations with APs on different interfaces. A non-limiting example 1400 is shown in FIG. 14.

In some embodiments, with a common address signaled from non-AP EHT STA2 to DS, the DS "knows" how to transfer all the packets destined to non-AP EHT STA2 over multiple associated interfaces. With a common address used by EHT AP to DSM, the DS "knows" the single "output AP" to route all the packets to non-AP EHT STA2, where EHT AP1 can then decide locally/internally through which interface to transmit the relevant packets to non-AP EHT STA2 as shown in the example of FIG. 13.

In some embodiments, one or more of the following may be applicable to the EHT AP side. In some embodiments, an ID is announced to indicate that different APs on different interfaces with same or different MAC addresses can support aggregation/TID switching operation/multiple associations. In some embodiments, APs may be co-located, which means that they are in one physical devices. In some embodiments, the ID may be included in an information element. In some embodiments, the element can be either multi-band element, new element designed for EHT aggregation operation, neighbor report element, reduced neighbor report element, or any other element. In some embodiments, the element can be transmitted within beacon, association response, re-association response, probe response frames. In some embodiments, the identifier may be called a different name, but the functionality of the ID (indicating which interfaces by which AP support aggregation together or by which AP support multiple associations or by which AP support TID switching stream) is the same.

In some embodiments, if different EHT APs on different interfaces with same or different MAC addresses has the same ID, these APs will have a common MAC address accessible to DSM. In some embodiments, EHT AP should signal the common MAC address to the non-AP EHT STA in an element. In some embodiments, the element can be either multi-band element, new element designed for EHT aggregation operation, neighbor report element, reduced neighbor report element, or any other element. In some embodiments, the element can be transmitted within beacon, association response, re-association response, probe response frames. In some embodiments, the common MAC address used by AP can be the same as the ID. In some embodiments, the common MAC address used by AP will be used as SA or DA.

In some embodiments, one or more of the following may be applicable to the non-AP EHT STA side. In some embodiments, STA indicates to the AP the interfaces that will have aggregation/TID switching operation/multiple associations. In some embodiments, the interfaces are among the interfaces from the AP with the same ID. In some embodiments, the indication can be in an element. In some embodiments, the element can be either multi-band element, new element designed for EHT aggregation operation, neighbor report element, reduced neighbor report element, or any other element. In some embodiments, the element can be included in association request, re-association request, probe request frames. In some embodiments, the indication from STA side can also be an ID.

In some embodiments, a common MAC address is announced by the non-AP EHT STA to indicate that different interfaces with same or different MAC addresses under associations for aggregation/TID switching operation to help DS mapping. In some embodiments, the common MAC address should be included in an element. In some embodiments, the element can be either multi-band element, new element designed for EHT aggregation operation, neighbor report element, reduced neighbor report element, or any other element. In some embodiments, the element can be received in association request, re-association request, probe request frames. In some embodiments, the common MAC address can be indicated implicitly. In some embodiments, if STA uses the same MAC address on all interfaces, then the interface address is the common MAC address used for DS mapping. In some embodiments, the smallest/largest MAC address on all interfaces is the common MAC address used for DS mapping. In some embodiments, one of the MAC address among the interface address used in different interfaces. The indication is based on a predefined property. In some embodiments, the common MAC address used by STA will be used in 4 address field of MPDU as SA or DA. In some embodiments, the common MAC address used by STA will be used in SA/DA field of basic A-MSDU in a MPDU.

In some embodiments, in a A-MSDU subframe header shown in 1500 in FIG. 15: if the A-MSDU is transmitted by the EHT AP, the DA is the common MAC address used by non-AP EHT STA; if the A-MSDU is transmitted by the non-AP EHT STA, the SA is the common MAC address used by non-AP EHT STA.

In some embodiments, a table may be used, including but not limited to a table from an 802.11 standard revised as shown below. In some embodiments, all the RA, TA will be based on interface address, which may be different from the common address used by EHT AP or non-AP EHT STA. In some embodiments, when a MPDU is sent by non-AP EHT STA with "To DS" set to 1, the DA is the common MAC address used by non-AP EHT STA on the other end. In some embodiments, when a MPDU is sent by EHT AP with "From DS" set to 1, the SA is the common MAC address used by non-AP EHT STA on the other end.

| To DS | From DS | Address 1 | Address 2 | Address 3 Basic A-MSDU | MSDU | Address 4 MSDU | Basic A-MSDU |
|---|---|---|---|---|---|---|---|
| 0 | 0 | RA = interface address of receiver | TA = interface address of transmitter | BSSID | BSSID | N/A | N/A |
| 0 | 1 | RA = interface address of receiver | TA = BSSID | SA | BSSID | N/A | N/A |
| 1 | 0 | RA = BSSID | TA = interface address of transmitter | DA | BSSID | N/A | N/A |
| 1 | 1 | RA = interface address of transmitter | TA = interface address of transmitter | DA | BSSID | SA | BSSID |

FIG. 16 shows an example 1600 for the address setting. Consider two BSSs. BSS1 has EHT AP1 and associated non-AP EHT STA1. BSS2 has EHT AP2 and associated non-AP EHT STA2. AP1 and AP2 connects through Distributed service medium. It is assumed that there is BA for all TIDs between each AP and its associated STAs.

In Case 1, one or more of the following operations may be used. In operation #1, STA1 sends MPDU1 with basic A-MSDU1 to STA2 through interface 1. For MPDU1: To DS of MPDU1 is set to 1; From DS of MPDU1 is set to 0; Address 1 of MPDU1 is set to AP1 MAC address of interface 1; Address 2 of MPDU1 is set to STA1 MAC address of interface 1; Address 3 of MPDU1 is set to BSSID of AP1 of interface 1, which is equal to AP1 MAC address of interface 1; Address 4 is MPDU 1 is reserved; DA of basic A-MSDU1 in MPDU1 is set to STA2 address to DS; SA of basic A-MSDU1 in MPDU1 is set to STA1 address to DS. In operation #2, AP1 routes the Basic A-MSDU1 in DSM to AP2. In operation #3, AP2 sends the MPDU2 with basic A-MSDU1 to STA2 in interface 1. For MPDU2: To DS of MPDU2 is set to 0; From DS of MPDU2 is set to 1; Address 1 of MPDU2 is set to STA2 MAC address of interface 1; Address 2 of MPDU2 is set to AP2 MAC address of interface 1; Address 3 of MPDU2 is set to BSSID of AP2 of interface 1, which is equal to AP2 MAC address of interface 1; Address 4 is MPDU 2 is reserved; DA of basic A-MSDU1 in MPDU1 is set to STA2 address to DS, SA of basic A-MSDU1 in MPDU1 is set to STA1 address to DS.

For case #2, one or more of the following operations may be performed. In operation #1, STA1 sends MPDU3 with MSDU from STA1 to STA2 through interface 2. For MPDU3: To DS of MPDU3 is set to 1; From DS of MPDU3 is set to 0; Address 1 of MPDU3 is set to AP1 MAC address of interface 2 (RA); Address 2 of MPDU3 is set to STA1 MAC address of interface 2 (TA); Address 3 of MPDU3 is set to STA2 address to DS (DA); Address 4 of MPDU3 is reserved. In operation #2, AP1 routes MSDU from STA1 to AP2. AP1 knows SA of STA1 from STA1's indication of common address. In operation #3, AP2 sends MPDU4 with MSDU from STA1 to STA2 through interface 2, and: To DS of MPDU4 is set to 0; From DS of MPDU4 is set to 1; Address 1 of MPDU4 is set to STA2 MAC address of interface 2 (RA); Address 2 of MPDU4 is set to AP2 MAC address of interface 2 (TA); Address 3 of MPDU4 is set to STA1 address to DS (SA); Address 4 of MPDU4 is reserved.

In some embodiments, an EHT (extreme high throughput) protocol and/or technique may utilize 320 MHz bandwidth, 16 spatial stream, and/or multi-band operation to further enhance the performance of Wi-Fi devices. In some embodiments, HE and XT devices will be multi-band devices (non-concurrent/single radio or concurrent/multi-radio). In some embodiments, efficiency benefits can be achieved in revisiting the management of operation over multiple bands. In some embodiments, load balancing, traffic steering and/or other may be used. In some embodiments, further peak throughput increase can be achieved by enabling multi-band aggregation (at layer 1 and/or layer 2), which may enable one or more of: more chances to get 320 MHz bandwidth, ability to get even higher bandwidth and/or other.

In some embodiments, traffic identifiers (TID) are the identifiers usable by higher layer entities to distinguish medium access control (MAC) service data units (MSDUs) to MAC entities that support quality of service (QoS) within the MAC data service. In some embodiments, if a transmitter wants to transmit an aggregated MPDUs belonging to a certain TID stream, the transmitter will initiate ADDBA request/response sequence to setup BA agreement with the intended receiver. The ADDBA request frame will indicate the TID for which the block ack agreement is being set up.

In some embodiments, once the BA agreement setup is completed, the transmitter can then transmit an Aggregated MPDUs (A-MPDUs) from that TID to the receiver. Note that BA agreement is individually established between the transmitter side and the receiver side. That is, for two STAs case (designated as STA1 and STA2), If STA1 wants to transmit A-MPDUs to STA 2 for a specific TID stream, then STA1 needs to establish a BA agreement with STA2. Similarly, if STA2 wants to transmit A-MPDUs to STA1 for a specific TID stream, then STA2 needs to establish a BA agreement with STA1. As a result, for a single TID, we may have up to two different BA agreements for A-MPDU exchanges between each pair of STAs.

In some embodiments, once the BA setup is completed, the transmitter can then transmit a TID stream to the receiver. Note that for two STAs, say STA1 and STA2. If STA1 wants to transmit to STA 2 for a TID stream, then STA1 needs to have ADDBA setup with STA2. Similarly, if STA2 wants to transmit to STA1 for a TID stream, then STA2 needs to have ADDBA setup with STA1. As a result, for one TID, to have STA1 and STA as transmitters, we will need two ADDBA setup: one setup, where STA1 sends request and STA2 sends response, and another setup, where STA2 sends request and STA1 sends response.

In some embodiments, when BA agreement is operating, there are dynamic parameters based on the status of transmission as shown in 1700 in FIG. 17 (See 10.24.7.2 HT-immediate block ack architecture for details.)

In some embodiments, multi-band operation and FST may be used. Consider 1800 in FIG. 18 in which two STAs 504 have two interfaces, which can be in same band or different bands. As a typical use case, STA 1 can be AP with concurrent operation capability, and STA2 can be non-AP STA without concurrent operation capability. For STA1 and STA2, same or different MAC address can be used in different interfaces.

In some embodiments, for Multi-band operation, FST has introduced the concept of TID streaming switching as one of the major use case. The concept is that for one negotiating TID stream, STA1 without concurrent operation capability can decide which interface to use based on implementation specific criteria like air time usage of each interface.

In some embodiments, for concurrent operation, STA1 and STA2 can negotiate one set of TIDs to operate in interface 1 and another set of TIDs to operate in interface 2. The switching mechanism can change the set of TIDs operating in each interface. This concept is captured in EHT multi-band description about load balancing and traffic steering. The above concept has been one of the usage models addressed by fast session transfer (FST) in the current 802.11 2016 spec. A state diagram for the FST setup protocol is shown in 1900 in FIG. 19.

In some embodiments, FST also has assumption about state transfer between two interfaces. Specifically, two modes are defined: transparent and nontransparent mode. The description are provided below. First, the following set of sentences describe the definition of transparent mode and nontransparent mode. The FST session addressing mode is transparent if both initiator and responder of the FST session use the same MAC address in the frequency bands/channels involved in the FST. The FST session addressing mode is nontransparent if either the initiator or responder use different MAC addresses in the different frequency bands/channels involved in the FST session.

The following set of sentences describe the assumption of accessing local information. For transparent FST, a shared multi-band management entity has access to the local information within each SME. For nontransparent FST, the function of the multiband management entity is restricted to coordinating the setup and teardown of a session transfer with no access to other local information within each SME. Therefore, with nontransparent FST, any information local to an SME needs to be reestablished for the new band/channel, and this can be done either prior to or following the session transfer (see 11.33).

The following sentence describes that association state is transferred from the old band to the new band. In some cases, the intention is to have all the states, including block ack agreements, TSs, association state, RSNA, security keys, sequence counter, and PN counter, transferred from the old band to the new band. Upon transition to the Transition Done state and if transparent FST is used, the association state (see 11.3.1) of the STA corresponding to the old band/channel is transferred to the STA corresponding to the new band/channel.

In some embodiments, for the multi-band operation to accommodate the most general use case described in EHT like aggregation, it may be desirable to have a more flexible interface activation signaling on top of the existing switching signaling. Specifically, we will want to achieve the following usage scenario. In some cases, STAs 504 may want to have "faster" switching signaling for operation in different interfaces, compared to two-way handshake introduced in FST, and react quickly to channel status or load condition in different interfaces. In some embodiments, when both STAs have concurrent operation and does not have one TID stream aggregation in multiple interfaces, described as aggregation in EHT feature description, STAs can activate and deactivate interfaces for concurrent operation to save power without losing existing negotiation status like TWT. In some embodiments, when both STAs have concurrent operation and have one TID stream aggregation in multiple interfaces, described as aggregation in EHT feature description, STAs can activate and deactivate interfaces for concurrent operation to save power without losing existing negotiation status like TWT. In some embodiments, when STAs have concurrent operation capability for only a subset of all the negotiated interfaces, e.g. only 2 out of 3 interfaces, STAs can activate some interfaces and deactivate other interfaces for concurrent operation to meet concurrent operation capability without losing existing negotiation status like TWT.

In some embodiments, a general activation concept may be used in one or more scenario, including but not limited to one or more of: STAs without concurrent operation capability; STAs with concurrent operation capability; STAs with concurrent operation capability but the concurrent operation can only happen for a subset of all negotiated interfaces; STAs without TID aggregation capability in different interfaces under concurrent operation capability; STAs with TID aggregation capability in different interfaces under concurrent operation capability; and/or other.

In some embodiments, one or more of the following may be used to enable this activation concept. In some embodiments, enhancement of TWT negotiations in each interface for STAs without concurrent capability may be used. STA can then follow the pre-negotiated TWT schedule in each interface for operation. STA can negotiate TWT schedule to be not overlapping in different interfaces. In some embodiments, signaling may be used to deactivate an interface, where all the negotiation status is preserved, and certain operations like TWT are suspended, and activate an interface, where all the negotiation status are reused, and suspended operations like TWT are resumed.

In some cases, faster signaling like enhanced TWT negotiation may avoid the tedious 2-way handshake signaling. In some cases, activation/deactivation signaling may enhance power save operation, meet the STA's operation capability, and avoids renegotiation when an interface is activated.

It should be noted that the term "interface" may be used herein, which may be determined by the interface MAC address of both devices and the operating band and channel of the interface. The term may be changed to segment or other terms, but the scope of embodiments described herein in not affected by the term.

In some embodiments, indication of capability based on various scenarios may be used. In some embodiments, an enhancement of FST or part of a new proposed TID switching mechanism may be used. The proposed concept is not limited by which method is used at the end.

In some embodiments, a capability indication may be used to specify if a STA can operate simultaneously in more than one interface. In a non-limiting example, the STA can indicate that it is capable of only operating at one interface at one time, i.e., non-concurrent operation. In another non-limiting example, the STA can indicate that it is capable of operating at more than one interface at one time, i.e., concurrent operation.

In some embodiments, a capability indication may be used to specify the maximum number of interfaces that a STA can operate at one time. In a non-limiting example, the STA can indicate 1, i.e., non-concurrent operation. In another non-limiting example, the STA can indicate more than 1, i.e., concurrent operation.

In some embodiments, a capability indication may be used to specify if a STA can support TID aggregation feature in more than one interface. In a non-limiting example, the STA can indicate that a TID can only operate in one interface at specific time. In another non-limiting example, the STA can indicate that a TID can operate simultaneously in more than one interface at a specific time.

In some embodiments, a general concept of interface ID can be used to facilitate the following negotiation signaling. In some embodiments, an enhancement of FST or part of a new proposed TID switching mechanism may be used. The proposed concept is not limited by which method is used at the end.

In some embodiments, each interface may be allocated an interface ID that represents the interface. Note that an interface is a jointly determined by the MAC address on both sides and the operation band and channel of the interface. An allocated interface ID can easily refer to a specific interface without including the MAC address on both sides and the operation band and channel of the interface. In some embodiments, the interface ID can be assigned in the extended field of multi-band element used for the negotiation of operating interface. In some embodiments, the interface ID can be assigned in the new element designed for the negotiation of operating interface. In some embodiments, the interface ID can be assigned in the extended field of ADDBA extension element used for the negotiation of operating interface.

In some embodiments, enhanced TWT negotiation scheduling may be used. Two cases are considered herein, but the scope of embodiments is not limited to these two cases. In some embodiments, an enhancement of FST or part of a new proposed TID switching mechanism may be used. The proposed concept is not limited by which method is used at the end.

In Case 1, separate negotiation on different interfaces may be used. In some embodiments, TWT schedule negotiated in an interface works only for that interface. In some embodiments, multi-band element can be included together with TWT element to indicate the interface that the TWT schedule is negotiating. In some embodiments, OCT can be used to negotiate TWT schedule on a different interface from the interface used to transmit the frame. In some embodiments, TWT signaling may be enhanced to include the time that shall not be included in the TWT schedule. In some embodiments, the time can be the TWT schedule used in other interface. In some embodiments, separate negotiation is one way to have non-overlapping TWT schedule in different interfaces.

In Case 2, joint negotiation for multiple interfaces may be used. In some embodiments, multiple TWT elements may be considered in one negotiation. In some embodiments, one or more of the following may be used: operating class; channel; MAC address of both STAs of an interface to an TWT element to indicate the interface that are used for the TWT element; and/or other. In some embodiments, an interface ID may be included in a TWT element to indicate the interface that are used for the TWT element. In some embodiments, joint negotiation may be used to have non-overlapping TWT schedule in different interfaces.

In some embodiments, activation/deactivation signaling of the interface may be used. In some embodiments, an enhancement of FST or part of a new proposed TID switching mechanism may be used. The proposed concept is not limited by which method is used at the end.

In some embodiments, the meaning of deactivating interface can be any combination of the following: the STA that sends the signaling is not available for receiving data through the interface; the STA that sends the signaling is not available for receiving any frame through the interface; the STA that sends the signaling is not available for transmitting data through the interface; the STA that sends the signaling is not available for transmitting any frame through the interface; all negotiated scheduling operation, like TWT, are suspended and can be resumed when the interface is activated (wherein suspended TWT in an interface means that a STA is not required to awake in the TWT schedule of the corresponding interface); negotiation status like association, authentication, TWT, operating bandwidth, and Rx NSS, are preserved and can be reused when the interface is activated; and/or other.

In some embodiments, the indication signaling will indicate which interface is activated. In some embodiments, the indication signaling will indicate which interface is not activated. In some embodiments, the signaling of interface can have one or more of the following formats: a bitmap where each bit represents an interface ID that indicates the interface to be activated; a bitmap where each bit represents an interface ID that indicates the interface to be deactivated; a list of interface ID that indicates the interface to be activated: a list of interface ID that indicates the interface to be deactivated; a series of interface indication, where each interface indication have MAC address on both sides and band/channel of the interface, that indicates the interface to be activated; a series of interface indication, where each interface indication have MAC address on both sides and band/channel of the interface, that indicates the interface to be deactivated; a bit to indicate that the interface used to transmit the signaling is activated; a bit to indicate that the interface used to transmit the signaling is deactivated; implicit indicating that the interface used to transmit the signaling is activated; implicit indicating that the interface used to transmit the signaling is deactivated; and/or other.

In some embodiments, the activation/deactivation signaling can be a one-way handshake. In some embodiments, the activation signaling can be in the MAC header of a frame like HE-A control signaling introduced in HE PPDU. In some embodiments, new control variant that can be carried in HE-A control field. In some embodiments, an entry in control ID subfield can be reserved for this purpose. In some embodiments, signaling design for EHT control that can be carried in HT control field. In some embodiments, the activation signaling can be a separate action frame. In some embodiments, the action frame can belong to the family of action frame designed for EHT.

In some embodiments, the activation signaling can be a two-way handshake. In some embodiments, FST setup request/response can be reused and different FST action field entry are introduced. In some embodiments, a separate action frame can be designed for the request/response exchange. In some embodiments, the action frame can belong to the family of action frame designed for EHT.

In some embodiments, a goal of TID stream switching is to view the two interfaces as one pipeline so that if one STA, say STA2, does not have concurrent capability, STA2 can choose the best interface to use based on any criteria at any time. Moreover, STA2 may do the switch multiple times as shown in 2000 in FIG. 20. To efficiently achieve this goal, it may be desirable to optimize the FST transition.

In some embodiments, one or more of the following may be performed: decouple the capability of access local information from the MAC address setting; introduce a mode where local information can be accessed while different MAC address setting is used; enable preservation of negotiation status in old interface (band/channel) while switching a TID to a new interface (band/channel); enable preservation of BA context like scoreboard context while switching from old interface to the new interface; and/or other.

In some cases, one or more of the following may be realized as a result of the above techniques and/or other techniques: local information can be accessed even when MAC address is different, which may align with realistic implementation like multiple BSSID: negotiation status can be preserved while switching interface such that negotiation can only be done once for multiple switches; preservation of BA context like SSN and scoreboard context can enable the STA to view multiple interfaces as truly one data pipe.

It should be noted that descriptions herein may use the term interface, which is determined by the interface MAC address of both devices and the operating band and channel of the interface. The term may be changed to segment or other terms, but the concept of embodiments described herein is not affected by the term.

In some embodiments, techniques to enable access to local information while having different MAC addresses in different interfaces may be used. Such techniques may include an enhancement of FST or part of a new proposed TID switching mechanism. The proposed concept is not limited by which method is used at the end.

In some embodiments, a capability indication of accessing local information in different interfaces is introduced. In some embodiments, this indication can decouple the assumption of MAC addresses and accessing to local information. In some embodiments, this indication can be used by mechanism including FST. In some embodiments, a STA with different MAC addresses in different interfaces can set the indication to indicate capable of accessing local information. In some embodiments, a STA with same MAC addresses in different interfaces can set the indication to indicate not capable of accessing local information.

In some embodiments, a new mode, such as a mixed mode, may be used. In some embodiments, in mixed mode, ability to access local information is possible. In some embodiments, in mixed mode, MAC addresses in different interfaces can be the same or different. In some embodiments, the new mode can be a new mode in FST or a new mode of another mechanism.

In some embodiments, an enhancement of FST or part of a new proposed TID switching mechanism may be used. The proposed concept is not limited by which method is used at the end.

In some embodiments, an indication is introduced to indicate that negotiation status of the old interface, say interface 1, is preserved and may be suspended when switching a TID from an old interface to a new interface. In some embodiments, the negotiation status may be suspended if all the TID streams in the old interface are switched to the new interface. In some embodiments, negotiation status includes association, authentication, TWT, or any negotiation that establish certain mechanism for operation in the old interface. In some embodiments, the negotiation status is resumed if the negotiation status in the old interface is suspended and the STA switch any TID back to the old interface from the new interface. In some embodiments, the indication can be in the extended field of multi-band element used for the negotiation of operating interface. In some embodiments, the indication can be in the new element designed for the negotiation of operating interface. In some embodiments, the indication can be in the extended field of ADDBA extension element used for the negotiation of operating interface.

In some embodiments, an enhancement of FST or part of a new proposed TID switching mechanism may be used. The proposed concept is not limited by which method is used at the end. In some embodiments, when a TID stream is switched, the receiver will switch the block ack record of the old interface to be used in the new interface, which consists of TID, and a record of reordering buffer size indexed by the received MPDU sequence control value. In some embodiments, this record should have buffer size larger than the largest buffer size that can be supported by any interface. In some cases, such as in an 802.11 specification, one block ack record is maintained for each interface and transmitter address (or originator address as specified in the spec). Herein, it is proposed that different interface with different transmitter address will share one block ack record. In some embodiments, this can work for full-state operation. For partial-state operation, the record may be temporary, and if the record exists, it will be switched as well.

In some embodiments, when a TID stream is switched, the transmitter will have the following status to be used in the new interface: status of MPDUs that have been already positively acknowledged maintained in the old interface; status of WinStartO maintained in the old interface; and/or other. In some embodiments, this maximum number of MPDUs that can have status being maintained should be larger than the largest buffer size that can be supported by any interface.

In some embodiments, for the above requirements on transmitter and receiver, the transmitter can have one transmitter buffer shared by multiple interfaces so that status of MPDUs that have been already positively acknowledged can be shared by multiple interfaces. In some embodiments, the buffer size can be larger than the buffer limit imposed by specific interface. In some embodiments, the receiver can have one receiver reordering buffer shared by multiple interfaces so that a record of reordering buffer size indexed by the received MPDU sequence control value can be shared by multiple interfaces. In some embodiments, the buffer size can be larger than the buffer limit imposed by specific interface.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a non-access point (non-AP) station (non-AP STA), the apparatus comprising: processing circuitry; and memory,
   wherein the non-AP STA is affiliated with a non-AP multi-link device (MLD) that includes more than one other affiliated non-AP STAs,
   wherein for multi-link operation (MLO), the processing circuitry is configured to:
   perform a multi-link setup procedure with an AP MLD, the AP MLD comprising more than one affiliated APs, the multi-link setup procedure to set up links between the non-AP MLD and the AP MLD to allow frames to be communicated between the non-AP MLD and the AP MLD using a single medium access control (MAC) service access point (SAP), wherein as part of the multi-link setup procedure, the processing circuitry is configured to:

encode an association request frame for transmission to the AP MLD to initiate the multi-link setup procedure; and decode an association response frame from one of the APs affiliated with the AP MLD, wherein the association request frame is encoded to indicate the links that are requested for setup and to carry an element that includes a MAC address of the non-AP MLD and capabilities of the non-AP STAs affiliated with the non-AP MLD, and wherein the association response frame indicates which of the links are accepted for setup and carries an element that includes a MAC address of the AP MLD and capabilities of the APs that are affiliated with the AP MLD.

2. The apparatus of claim 1, wherein the links that are setup between the non-AP MLD and the AP MLD are set up on different non-overlapping channels.

3. The apparatus of claim 2, wherein the non-AP MLD has the single MAC SAP to logical link control (LLC), which includes one MAC data service.

4. The apparatus of claim 3, wherein the AP MLD has a different single MAC SAP to LLC, which includes one MAC data service.

5. The apparatus according to claim 2, wherein the multi-link setup procedure is performed by the processing circuitry to enable access to a distribution system (DS) via the AP MLD for the non-AP STAs affiliated with the non-AP MLD.

6. The apparatus according to claim 5, wherein the association request frame includes:

per-link identifiers and per-link configuration information of each of the links requested to be set up by the multi-link setup procedure.

7. The apparatus according to claim 6, wherein the element of the association request frame includes information for each of the non-AP STAs affiliated with the non-AP MLD.

8. The apparatus according to claim 7, wherein to reduce frame size of the association request frame, the element of the association request frame is encoded to include an inheritance indicator, the inheritance indicator indicating when one or more capabilities of one of the non-AP STAs are to be inherited from another of the non-AP STAs.

9. The apparatus of claim 1, wherein the processing circuitry comprises a baseband processor.

10. The apparatus of claim 9, wherein the memory is configured to store the element carried by the association request frame.

11. A non-transitory computer-readable storage medium that stores instructions for execution by processing circuitry of a non-access point (non-AP) station (non-AP STA), wherein the non-AP STA is affiliated with a non-AP multi-link device (MLD) that includes more than one other affiliated non-AP STAs, wherein for multi-link operation (MLO), the processing circuitry is configured to:

perform a multi-link setup procedure with an AP MLD, the AP MLD comprising more than one affiliated APs, the multi-link setup procedure to set up links between the non-AP MLD and the AP MLD to allow frames to be communicated between the non-AP MLD and the AP MLD using a single medium access control (MAC) service access point (SAP), wherein as part of the multi-link setup procedure, the processing circuitry is configured to:

encode an association request frame for transmission to the AP MLD to initiate the multi-link setup procedure; and decode an association response frame from one of the APs affiliated with the AP MLD, wherein the association request frame is encoded to indicate the links that are requested for setup and to carry an element that includes a MAC address of the non-AP MLD and capabilities of the non-AP STAs affiliated with the non-AP MLD, and wherein the association response frame indicates which of the links are accepted for setup and carries an element that includes a MAC address of the AP MLD and capabilities of the APs that are affiliated with the AP MLD.

12. The non-transitory computer-readable storage medium of claim 11, wherein the links that are setup between the non-AP MLD and the AP MLD are set up on different non-overlapping channels.

13. The non-transitory computer-readable storage medium of claim 12, wherein the non-AP MLD has the single MAC SAP to logical link control (LLC), which includes one MAC data service.

14. The non-transitory computer-readable storage medium of claim 13, wherein the AP MLD has a different single MAC SAP to LLC, which includes one MAC data service.

15. The non-transitory computer-readable storage medium according to claim 12, wherein the multi-link setup procedure is performed by the processing circuitry to enable access to a distribution system (DS) via the AP MLD for the non-AP STAs affiliated with the non-AP MLD.

16. The non-transitory computer-readable storage medium according to claim 15, wherein the association request frame includes:

per-link identifiers and per-link configuration information of each of the links requested to be set up by the multi-link setup procedure.

17. The non-transitory computer-readable storage medium according to claim 16, wherein the element of the association request frame includes information for each of the non-AP STAs affiliated with the non-AP MLD, wherein to reduce frame size of the association request frame, the element of the association request frame is encoded to include an inheritance indicator, the inheritance indicator indicating when one or more capabilities of one of the non-AP STAs are to be inherited from another of the non-AP STAs.

18. An apparatus for an Access Point (AP) station (AP STA), the apparatus comprising: processing circuitry; and memory, wherein the AP STA is affiliated with a AP multi-link device (MLD) that includes more than one other affiliated AP STAs, wherein for multi-link operation (MLO), the processing circuitry is configured to:

perform a multi-link setup procedure with an non-AP MLD, the non-AP MLD comprising more than one affiliated non-AP STAs, the multi-link setup procedure to set up links between the non-AP MLD and the AP MLD to allow frames to be communicated between the non-AP MLD and the AP MLD using a single medium access control (MAC) service access point (SAP), wherein as part of the multi-link setup procedure, the processing circuitry is configured to:

decode an association request frame received from one of the non-AP STAs of the non-AP MLD to initiate the multi-link setup procedure; and encode an association response frame for transmission to the one of the non-AP STAs affiliated with the non-AP MLD, wherein the association request frame indicates the links that are requested for setup and to carry an element that includes a MAC address of the non-AP MLD and capabilities of the non-AP STAs affiliated with the non-AP MLD, and wherein the association response frame is encoded to indicate which of the links are accepted for setup and carries an element that includes a MAC address of the AP MLD and capabilities of the APs that are affiliated with the AP MLD.

19. The apparatus of claim 18, wherein the links that are setup between the non-AP MLD and the AP MLD are set up on different non-overlapping channels.

20. The apparatus of claim 19, wherein the non-AP MLD has the single MAC SAP to logical link control (LLC), which includes one MAC data service, and wherein the AP MLD has a different single MAC SAP to LLC, which includes one MAC data service.

\* \* \* \* \*